United States Patent
Tanelli et al.

(10) Patent No.: US 12,528,597 B2
(45) Date of Patent: Jan. 20, 2026

(54) METHOD AND SYSTEM FOR DETECTING ANOMALIES RELATING TO COMPONENTS OF A TRANSMISSION SYSTEM OF AN AIRCRAFT, IN PARTICULAR A HELICOPTER

(71) Applicant: LEONARDO S.P.A., Rome (IT)

(72) Inventors: Mara Tanelli, Milan (IT); Jessica Leoni, Milan (IT); Alberto Bellazzi, Samarate (IT); Francesca Bianchi, Samarate (IT); Luigi Bottasso, Samarate (IT); Andrea Palman, Samarate (IT)

(73) Assignee: LEONARDO S.P.A., Rome (IT)

( * ) Notice: Subject to any disclaimer, the term of this patent is extended or adjusted under 35 U.S.C. 154(b) by 132 days.

(21) Appl. No.: 18/559,698

(22) PCT Filed: Apr. 21, 2022

(86) PCT No.: PCT/IB2022/053734
§ 371 (c)(1),
(2) Date: Nov. 8, 2023

(87) PCT Pub. No.: WO2022/243764
PCT Pub. Date: Nov. 24, 2022

(65) Prior Publication Data
US 2024/0228057 A1    Jul. 11, 2024

(30) Foreign Application Priority Data
May 18, 2021 (EP) .................................. 21425025

(51) Int. Cl.
*B64D 45/00* (2006.01)
*B64F 5/60* (2017.01)
*B64C 27/12* (2006.01)

(52) U.S. Cl.
CPC ................ *B64D 45/00* (2013.01); *B64F 5/60* (2017.01); *B64C 27/12* (2013.01); *B64D 2045/0085* (2013.01)

(58) Field of Classification Search
CPC ... B64D 45/00; B64D 2045/0085; B64F 5/60; B64C 27/12
(Continued)

(56) References Cited

U.S. PATENT DOCUMENTS

| | | | |
|---|---|---|---|
| 6,019,310 A * | 2/2000 | Maino | F16H 57/00 180/338 |
| 10,657,736 B2 * | 5/2020 | Sundareswara | G07C 5/0808 |

(Continued)

FOREIGN PATENT DOCUMENTS

| | | |
|---|---|---|
| CN | 111540471 | 8/2020 |
| EP | 0407179 | 1/1991 |

(Continued)

OTHER PUBLICATIONS

International Search Report and Written Opinion in corresponding International Patent Application No. PCT/IB2022/053734, mailed Jul. 6, 2022 (15 pages).

*Primary Examiner* — Muhammad Shafi
(74) *Attorney, Agent, or Firm* — Leason Ellis LLP

(57) ABSTRACT

A computer-implemented method is described for detecting anomalies in a transmission system of an aircraft equipped with a monitoring system, which includes a number of sensors coupled to the transmission system and determines, for each flight of the aircraft a number of respective time intervals and acquires through each sensor, for each of the time intervals, a corresponding primary signal indicative of a corresponding dynamic quantity dependent on the operation of the transmission system during at least part of the time interval. For each sensor, the monitoring system determines, starting from each primary signal acquired through (Continued)

the sensor during a corresponding time interval, a corresponding set of values of at least one corresponding group of synthetic indexes. The method includes detecting anomalies of the transmission system on the basis of the groups of synthetic indexes.

13 Claims, 15 Drawing Sheets

(58) Field of Classification Search
USPC .......................................................... 701/32.1
See application file for complete search history.

(56) References Cited

U.S. PATENT DOCUMENTS

| | | | | |
|---|---|---|---|---|
| 2004/0088861 | A1* | 5/2004 | Vinayak | F16H 57/0006 29/893.35 |
| 2009/0216393 | A1* | 8/2009 | Schimert | G05B 23/0254 701/14 |
| 2017/0148236 | A1* | 5/2017 | Sannino | G05B 23/0278 |
| 2020/0165995 | A1* | 5/2020 | Moeckly | G07C 5/02 |

FOREIGN PATENT DOCUMENTS

| | | | |
|---|---|---|---|
| EP | 0899553 | * | 3/1999 |
| EP | 0899553 A2 | * | 3/1999 |
| EP | 0889315 | | 2/2003 |
| EP | 0889315 B1 | * | 2/2003 |

* cited by examiner

| AcqID | TIME INTERVAL | $HI_{x,1}$ | ... | $HI_{x,18}$ | FLIGHT PARAMETERS |
|---|---|---|---|---|---|
| 1 | ... | ... | ... | ... | ... |
| 3 | ... | ... | ... | ... | ... |
| ... | ... | ... | ... | ... | ... |
| 45 | ... | ... | ... | ... | ... |
| ... | ... | ... | ... | ... | ... |
| 59 | ... | ... | ... | ... | ... |
| 60 | ... | ... | ... | ... | ... |
| ... | ... | ... | ... | ... | ... |
| 100 | ... | ... | ... | ... | ... |
| ... | ... | ... | ... | ... | ... |
| 180 | ... | ... | ... | ... | ... |

| SET_TH$_{1,1}$ | SET_TH$_{1,2}$ | ... | SET_TH$_{1,Nf}$ | M_SET_TH$_1$ |
|---|---|---|---|---|
| TH$_{1,1}$ | TH$_{1,2}$ | ... | TH$_{1,Pmax}$ | |
| TH$_{1,1}(1)$ | TH$_{1,2}(1)$ | ... | TH$_{1,Pmax}(1)$ | |
| TH$_{1,1}(2)$ | TH$_{1,2}(2)$ | ... | TH$_{1,Pmax}(2)$ | |
| ... | ... | ... | ... | |
| TH$_{1,1}(Nf-1)$ | TH$_{1,2}(Nf-1)$ | ... | TH$_{1,Pmax}(Nf-1)$ | |
| TH$_{1,1}(Nf)$ | TH$_{1,2}(Nf)$ | ... | TH$_{1,Pmax}(Nf)$ | |

FIG. 9

| SET_TH$_{x,1}$ | SET_TH$_{x,2}$ | ... | SET_TH$_{x,Nfx}$ | M_SET_TH$_x$ |
|---|---|---|---|---|
| TH$'_{1,1}$ | TH$'_{1,2}$ | ... | TH$'_{1,Pmax}$ | |
| TH$'_{1,1}(1)$ | TH$'_{1,2}(1)$ | ... | TH$'_{1,Pmax}(1)$ | |
| TH$'_{1,1}(2)$ | TH$'_{1,2}(2)$ | ... | TH$'_{1,Pmax}(2)$ | |
| ... | ... | ... | ... | |
| TH$'_{1,1}(Nfx)$ | TH$'_{1,2}(Nfx)$ | ... | TH$'_{1,Pmax}(Nfx)$ | |

METHOD AND SYSTEM FOR DETECTING ANOMALIES RELATING TO COMPONENTS OF A TRANSMISSION SYSTEM OF AN AIRCRAFT, IN PARTICULAR A HELICOPTER

CROSS-REFERENCE TO RELATED APPLICATIONS

This Patent Application is a U.S. National Phase Application under 35 U.S.C. § 371 of International Patent Application No. PCT/IB2022/053734, filed on Apr. 21, 2022, which claims priority from European Patent Application No. 21425025.0 filed on May 18, 2021, all of which are incorporated by reference, as if expressly set forth in their respective entireties.

TECHNICAL FIELD OF THE INVENTION

The present invention relates to a method and system for detecting anomalies relating to components of a transmission system of an aircraft, in particular a helicopter.

STATE OF THE ART

As is well known, helicopters are extremely complex and vulnerable aircraft, since there is a transmission system between the engine(s) and the rotors, which includes critical components. Single malfunctions of any of these components may be extremely dangerous to the safety of the helicopter.

In order to monitor the proper operation of a helicopter, so-called health and usage monitoring systems (HUMS) are known to be used. Typically, a HUMS system comprises a plurality of sensors (e.g. accelerometers), which are coupled to components of the transmission system and are adapted to monitor trends over time of corresponding physical quantities.

Furthermore, monitoring methods are known which envisage extracting so-called synthetic indexes known as "health indexes" starting from the signals generated by the sensors, which can be analysed to detect, for example, the presence of cracks on gear teeth, wear on bearings, imbalances affecting drive shafts, etc.

By way of example, FIG. 1 shows a transmission system 1, which is mechanically interposed between one or more engines (not shown) and the rotors (main and tail, not shown) of a helicopter $HC_1$ (not visible in FIG. 1; schematically shown in FIG. 4) and includes a plurality of mechanical components, which comprise drive shafts, gears, bearings (not shown), etc. For the sake of simplicity, in FIG. 1 only a first and a second gear (indicated respectively with $C_1$ and $C_2$) are accompanied by reference marks, which are coupled to each other so as to form a gearbox arranged in proximity to the tail rotor and enclosed in a corresponding first external protective substructure 5 (shown only symbolically in FIG. 1 and also known as a box or casting); the rotation of the first and second gear $C_1$, $C_2$ with respect to the first external protective substructure 5, and in particular the rotation of corresponding shafts integral with the first and second gear $C_1$, $C_2$ and extending through the first external protective substructure 5, is permitted by the presence of a number (typically, four, i.e., two per gear) of bearings (not shown in FIG. 1) each mechanically interposed between the box and a corresponding shaft. In general, therefore, groups of mechanical components are arranged within corresponding external protective substructures, which allow, by means of appropriate bearings and openings, the coupling with mechanical components of other groups. For example, FIG. 1 shows (symbolically) a second external protective substructure 7, which houses within it a corresponding portion of the transmission system 1. Altogether, the external protective substructures form an external structure 9 of the transmission system 1.

FIG. 1 further shows (symbolically) a plurality of sensors $A_i$ (with i=1, . . . 13), which form a monitoring system MS, are accelerometers (e.g., of the uniaxial type) and are mechanically coupled to corresponding points of the transmission system 1; in particular, each sensor $A_i$ is constrained to a corresponding point of the transmission system 1, so as to generate a corresponding signal (referred to in the following as the primary signal) indicative of a corresponding quantity (for example, the acceleration along a respective axis), which in turn depends on the vibrations to which sensor $A_i$ is subjected. Primary signals are typically analogue signals.

In more detail, each sensor $A_i$ is fixed to a corresponding point of the external structure 9 of the transmission system 1. For example, the sensor $A_i$ is fixed to a point on the first external protective substructure 5, so it is closer than all the other sensors to the aforementioned first and second gear $C_1$, $C_2$, as well as to the respective bearings. By way of example only, the sensors $A_2$-$A_8$, $A_{12}$ and $A_{13}$ are fixed to corresponding points of the second external protective substructure 7, in proximity to corresponding mechanical components.

The sensors may be arranged indifferently either on parts of the external structure 9 facing the mechanical components of the transmission system 1 or to the outside.

That being said, each primary signal is indicative of the operation and integrity of one or more components of the transmission system 1; in other words, the primary signal generated by each sensor $A_i$ is indicative of the operation of a corresponding subset of components of the transmission system 1. Therefore, it is known to calculate, starting from the primary signal provided by each sensor $A_i$, a plurality of health indexes relating to the components of the corresponding subset, by implementing a plurality of processing techniques. Furthermore, considering a single component, it can belong to several subsets associated with corresponding sensors $A_i$, i.e. it is known to calculate health indexes relating to the same component on the basis of several primary signals, as explained below.

In more detail, considering any primary signal (hereafter referred to as $s_i$) generated by a sensor $A_i$, it can be subjected to one or more processing techniques, which include digitising the primary signal $s_i$, in order to generate corresponding health indexes.

That said, as shown in FIG. 2, the primary signal $s_i$ may be subjected to one or more preliminary processing steps, selected for example from:

a synchronous processing (block 100), also known as time average processing, which is associated to a corresponding k-th component $C_k$, is a function of the angular velocity of the component $C_k$ (detected by means of an appropriate dedicated sensor, not shown) and provides generating a respective pre-processed signal $s'_{i,k}$, which is of digital type and is obtained by sampling the primary signal $s_i$ relating to a number Nrot of rotations of the component $C_k$ with a sampling frequency that is a multiple of the rotation frequency of the component $C_k$, in order to acquire, for each rotation, a number NS of samples relating to corresponding angular positions of the component $C_k$, and subsequently averaging, for each angular position, the corresponding samples (in number equal to Nrot), so that the pre-processed signal $s'_{i,k}$ includes a portion of the primary signal $s_i$ that is correlated with the angular velocity of the component $C_k$;

an envelope processing (block 200), which is associated with a corresponding k-th component $C_k$, is a function of the geometrical features of the k-th component $C_k$ and provides generating a high-frequency sampled version of the primary signal $s_i$, a low-frequency sampled version of the primary signal $s_i$ (hereinafter indicated as pre-processed signal $s''_{i,k,hf}$ and $s''_{i,k,lf}$) and a filtered sampled version (with high pass filtering) of the primary signal $s_i$ (hereinafter indicated as pre-processed signal $s''_{i,k,filt}$ and having the same sampling frequency as the pre-processed signal $s''_{i,k,hf}$, thus also being sampled at high frequency), which are indicative of the peak envelope of the primary signal $s_i$ and of a filtered version (with high pass filtering) of the primary signal $s_i$;

a processing based on time histories (block 300), which provides generating a version sampled at high-frequency (not necessarily equal to the high frequency used for envelope processing) of the primary signal $s_i$, a version sampled at low-frequency (not necessarily equal to the low frequency used for envelope processing) of the primary signal $s_i$ (hereinafter indicated as pre-processed signals $s'''_{i,hf}$ and $s'''_{i,lf}$) and a filtered sampled version (with high pass filtering) of the primary signal $s_i$ (referred to in the following as the pre-processed signal $s'''_{i,filt}$ and having the same sampling frequency as the pre-processed signal $s'''_{i,hf}$, thus also being sampled at high frequency), which are component-independent; and asynchronous processing (block 400), which is component-independent and provides generating a respective pre-processed signal $s''''_i$ of digital type by calculating the averaged spectrum of the primary signal $s_i$ and, subsequently, the so-called "cepstrum" of the averaged spectrum.

The health indexes are then calculated on the basis of the pre-processed signals obtained through the aforementioned preliminary processing, by implementing "feature extraction" algorithms that depend on the preliminary processing previously carried out.

In particular, the synchronous processing 100, the envelope processing 200, the time history-based processing 300 and the asynchronous processing 400 are respectively followed by the execution of a first, a second, a third and a fourth set of feature extraction algorithms (indicated with 110, 210, 310 and 410, respectively), starting from the pre-processed signal $s'_{i,k}$, from the triad of pre-processed signals $s''_{i,k,hf}$, $s''_{i,k,lf}$ and $s''_{i,k,filt}$, from the triad of pre-processed signals $s'''_{i,hf}$, $S'''_{i,lf}$, $S'''_{i,filt}$ and from the pre-processed signal $s''''_i$, respectively.

The health indexes obtained by executing the sets of feature extraction algorithms 110, 210 are characteristic of the behaviour of the component, i.e. they have a high specificity, while the health indexes obtained by executing the sets of feature extraction algorithms 310 and 410 are substantially independent from the features of the individual components and characterise, on the whole, the operation of the portion of the transmission system 1 (in the following, also referred to as zone) arranged in proximity to the sensor $A_i$ that generated the primary signal $s_i$.

For example, the feature extraction algorithms of the first, the second, the third and the fourth set 110, 210, 310 and 410 may include algorithms for extracting statistical values (e.g., calculations of averages, variances, peak-to-peak values, etc.), as well as calculations of shape factors (e.g., kurtosis) and/or direct measurements of amplitudes of spectral components and indicators of spectral energy distribution. Furthermore, it is possible that the pre-processed signals undergo further pre-processing, such as signal enhancement, phase demodulation, etc., before feature extraction.

For example, the set of feature extraction algorithms 110 may include so-called temporal analysis, spectral analysis, enhancement analysis and phase demodulation algorithms, which are executed on the pre-processed signal $S'_{i,k}$, before extracting the corresponding features.

The set of feature extraction algorithms 210 may include so-called algorithms for calculating the Hilbert transform of the pre-processed signals $s''_{i,k,hf}$, $S''_{i,k,lf}$ and $s''_{i,k,filt}$ and the subsequent extraction of features indicative of the energy associated with a plurality of predetermined frequencies.

The set of feature extraction algorithms 310 may include so-called residual analysis, temporal analysis and enhancement analysis algorithms, which are executed on the pre-processed signals $s'''_{i,hf}$, $s'''_{i,lf}$ and $s'''_{i,filt}$, prior to the aforementioned statistical value and/or form factor extraction algorithms.

The set of feature extraction algorithms 410 may comprise the extraction of a plurality of features relative to the aforementioned cepstrum.

In more detail, as shown schematically again in FIG. 1, the transmission system 1 is equipped with a processing system 10 and a storage system 11, coupled to each other and to the monitoring system MS. During each flight of the helicopter $HC_1$, for each time interval having a duration equal to $\Delta T$ (e.g., equal to fifteen minutes), the processing system 10 queries the sensors $A_i$, e.g., sequentially, in order to acquire the corresponding primary signals $s_i$ generated by the sensors $A_i$.

In other words, for each time interval of duration $\Delta T$, the processing system 10 acquires, for each sensor $A_i$, the corresponding primary signal $s_i$, which has a respective duration lower than the duration $\Delta T$. For each time interval having duration $\Delta T$, the corresponding primary signals $s_i$ therefore extend over different time domains and have different durations; the primary signals $s_i$ are therefore indicative of the trends of the corresponding quantities in the respective time domains.

Further, for each of said time intervals of duration $\Delta T$, the processing system 10 calculates a corresponding set of health indexes, as a function of the corresponding primary signals $s_i$, the calculated health indexes being thus indicative of the operation of the transmission system 1 during sub-portions of the time interval of duration $\Delta T$; the health indexes are stored in the storage system 11.

Having said that, it is well known that, given any primary signal $s_i$, the choice of processing that is performed, and therefore of the health indexes that are calculated, depends on the position of the sensor $A_i$ that generated it.

For example, FIG. 3 shows how the sensor $A_i$ is associated with the first and second gear $C_1$, $C_2$ and, for ease of visualisation, to only one of the bearings (indicated with $C_3$) of the aforementioned gearbox arranged near the tail rotor.

Furthermore, FIG. 3 shows how, starting from the primary signal $s_i$ generated by the sensor $A_1$, the aforementioned synchronous processing operations 100 are performed for each of the first and second gear $C_1$, $C_2$, so as to generate corresponding pre-processed signals $s'_{1,1}$, $s'_{1,2}$, which therefore depend on the angular velocities of the first and second gear $C_1$, $C_2$ and are strongly dependent on the operation of the first and, respectively, the second gear $C_1$, $C_2$.

In addition, starting from the primary signal $s_i$, envelope processing operations 200 are performed as a function of the geometric features of the bearing $C_3$, so as to generate the pre-processed signals $s''_{1,3,hf}$, $s''_{1,3,lf}$ and $s''_{1,3,filt}$, which are indicative of the operation of the bearing $C_3$.

Again starting from the primary signal $s_1$, the operations of the processing that is based on the time histories 300 and the asynchronous processing operations 400 are also performed, so as to generate respectively the pre-processed signals $s'''_{1,hf}$, $s'''_{1,lf}$ and $s'''_{1,filt}$ and the pre-processed signal $s''''_1$, which are indicative of the overall operation of a zone $Z_1$ of the transmission system 1 close to the sensor $A_1$; this zone $Z_1$ includes the first and the second gear $C_1$, $C_2$ and the bearing $C_3$ (as well as the other three bearings mentioned above and not discussed in detail for the sake of brevity).

In greater detail, referring for example again to FIG. 3, typically the aforementioned synchronous processing 100, envelope processing 200, processing based on time histories 300 and asynchronous processing 400 are performed starting from respective portions of the primary signal $s_1$ extending over respective sub-domains of the time domain associated with the sensor $A_1$. Regardless of this implementation detail, FIG. 3 further shows how, by executing the set of feature extraction algorithms 110 on the pre-processed signals $s'_{1,1}$ and $s'_{1,2}$, a first and a second set of (for example) eighteen health indexes, indicated with $HI_{1,1}$-$HI_{1,18}$ and $HI_{2,1}$-$HI_{2,18}$ respectively, are generated. The health indexes $HI_{1,1}$-$HI_{1,18}$ are associated with a first acquisition index $AcqID_1$, which is then associated with the triad (sensor $A_1$, first gear $C_1$, synchronous processing); the health indexes $HI_{2,1}$-$HI_{2,18}$ are associated with a second acquisition index $AcqID_2$, which is then associated with the triad (sensor $A_i$, second gear $C_2$, synchronous processing).

FIG. 3 further shows how, by executing the set of feature extraction algorithms 210 on the pre-processed signals $s''_{1,3,hf}$ and $s''_{1,3,filt}$, a third set of (for example) eighteen health indexes is generated, indicated with $HI_{3,1}$-$HI_{3,18}$ respectively, which are associated to a third acquisition index $AcqID_3$, which is thus associated to the triad (sensor $A_1$, bearing $C_3$, envelope processing based on the aforementioned high-frequency sampled version of the primary signal $s_i$ and on the aforementioned filtered sampled version of the primary signal $s_i$).

Furthermore, by executing the set of feature extraction algorithms 210 on the pre-processed signal $s''_{1,3,lf}$, a fourth set of (for example) nine health indexes, indicated with $HI_{4,1}$-$HI_{4,9}$ respectively, is generated, which are associated with a fourth acquisition index $AcqID_4$, which is then associated with the triad (sensor $A_1$, bearing $C_3$, envelope processing based on the aforementioned low-frequency sampled version of the primary signal $s_i$). In the following, as well as in FIG. 3, reference will be made for simplicity's sake in any case to a set of eighteen health indexes $HI_{4,1}$-$HI_{4,18}$, for example on the assumption that the health indexes $HI_{4,10}$-$HI_{4,18}$ are zero or otherwise indicative of a non-applicability condition.

In addition, FIG. 3 shows how a fifth and a sixth set of (for example) eighteen health indexes are generated, which are indicated with $HI_{5,1}$-$HI_{5,18}$ and $HI_{6,1}$-$HI_{6,18}$ respectively and are associated with a fifth and a sixth health index $AcqID_5$, $AcqID_6$ respectively.

In particular, the fifth set of health indexes $HI_{5,1}$-$HI_{5,18}$ is generated by executing the set of feature extraction algorithms 310 on the pre-processed signals $s'''_{1,hf}$ and $s'''_{1,filt}$; the fifth acquisition index $AcqID_5$ is thus associated to the triad (sensor $A_1$, zone $Z_1$, processing based on the time histories based on the aforementioned high-frequency sampled version of the primary signal $s_i$ and the aforementioned filtered sampled version of the primary signal $s_i$).

The sixth set of health indexes $HI_{6,1}$-$HI_{6,18}$ is generated by executing the set of feature extraction algorithms 310 on the pre-processed signal $s'''_{1,lf}$; the sixth acquisition index $AcqID_6$ is thus associated to the triad (sensor $A_1$, zone $Z_1$, time-history-based processing based on the aforementioned low-frequency sampled version of the primary signal $s_i$).

FIG. 3 finally shows how a seventh set of (for example) eighteen health indexes, indicated with $HI_{7,1}$-$HI_{7,18}$, is generated by executing the set of feature extraction algorithms 410 on the pre-processed signal $s''''_1$, respectively. The health indexes $HI_{7,1}$-$HI_{7,18}$ are associated with a seventh acquisition index $AcqID_7$, which is associated with the triad (sensor $A_1$, zone $Z_1$, asynchronous processing).

Similarly, the processing of the primary signal $s_2$ generated by the sensor $A_2$ leads to the generation of further sets of health indexes, associated with corresponding acquisition indexes. Furthermore, as explained also below, the numbering of the acquisition indexes associated with a single sensor may not be consecutive.

In practice, each acquisition index is relative to only one corresponding component or a corresponding zone, as well as to only one corresponding preliminary processing mode to be chosen from synchronous processing 100, envelope processing 200 (alternatively, based on the aforementioned high-frequency sampled version of the primary signal $s_i$ and on the aforementioned filtered sampled version of the primary signal $s_i$, or on the low-frequency sampled version of the primary signal $s_i$), time history-based processing 300 (alternatively, based on the aforementioned high-frequency sampled version of the primary signal $s_i$ and on the aforementioned filtered sampled version of the primary signal $s_i$, or on the low-frequency sampled version of the primary signal $s_i$) and asynchronous processing 400. Furthermore, each acquisition index is biunivocally associated with a corresponding set of health indexes. For example, in the following, it is assumed, unless otherwise specified, that the processing system 10 is configured to calculate health indexes relating to one hundred and eighty acquisition indexes, on the basis of the primary signals generated by the thirteen sensors $A_1$-$A_{13}$. However, it is possible that health indexes associated with one or more acquisition indexes are discarded, for example because they are irrelevant, unreliable or not applicable.

As mentioned above, the processing system 10 stores in the storage system 11 all the health indexes that are calculated as they are calculated during the time intervals of duration $\Delta T$ that follow each other during the flights of the helicopter $HC_1$.

Furthermore, as explained in more detail below, the processing system 10 stores flight parameter values in the storage system 11, which are acquired by means of additional sensors (indicated with 8 in FIG. 1), which are coupled to the helicopter $HC_1$ and are able to detect, for example, the temperature and/or pressure of the lubricating oil, the torque transmitted by the main rotor, the flight speed, the attitude of the aircraft, etc.).

In addition, for each time interval of duration $\Delta T$, the processing system 10 stores in the storage system 11 the pre-processed signals on the basis of which the health indexes for that time interval have been calculated. In particular, considering a generic time interval of duration $\Delta T$, the processing system 10 stores in the storage system 11 the pre-processed signals relating to this time interval, overwriting the pre-processed signals relating to the previous time interval of duration $\Delta T$.

Consequently, at the end of each flight, the storage system 11 of the helicopter $HC_1$ stores the pre-processed signals relating to the last time interval of duration $\Delta T$ of the flight of the helicopter $HC_1$; in the following reference is made to these pre-processed signals as the final time series $TH_{1,p}$, with p=1, ..., Pmax, wherein Pmax is for example equal to the total number of acquisition indexes AcqID. For example, referring for simplicity's sake only to the sensor $A_1$, and more particularly to the acquisition $AcqID_1$-$AcqID_7$ shown in FIG. 3, it occurs that the final time series $TH_{1,1}$-$TH_{1,7}$ are formed by the samples, respectively, of the pre-processed signals $s'_{1,1}$, $S'_{1,2}$, $S''_{1,3,hf}$, $S''_{1,3,lf}$, $s'''_{1,hf}$, $s'''_{1,lf}$ and $s''''_1$ generated by the processing system 10 during the last time interval of duration $\Delta T$ of the flight of the helicopter $HC_1$, on the basis of which the health indexes relating to the aforementioned last time interval of duration $\Delta T$ of the flight were then calculated. In other words, a corresponding pre-processed signal is stored for each acquisition index; only the pre-processed signals $S''_{1,3,filt}$ and $s'''_{i,filt}$ are not stored. The final time series $TH_{1,1}$-$TH_{1,7}$ are therefore successions of acceleration samples generated starting from the primary signal $s_i$ generated by the sensor $A_i$, by means of different processing.

In the presence of several helicopters, equipped for example in the same way (same sensors), it is thus possible to obtain what is shown in FIG. 4, in which for simplicity's sake reference is made, in addition to the helicopter $HC_1$, only to a further helicopter $HC_2$, identical to the helicopter $HC_1$ and equipped with a monitoring system identical to the monitoring system MS of the helicopter $HC_1$, as well as with a processing system, a storage system and additional sensors respectively identical to the processing system 10, the storage system 11 and the additional sensors 8 of the first helicopter $HC_1$.

In detail, for each flight of the helicopter $HC_1$, the processing system 10 of the helicopter $HC_1$ stores in the storage system 11 a corresponding set of final time series, collectively referred to as $SET\_TH_1$. Similarly, for each flight of the helicopter $HC_2$, the processing system of the helicopter $HC_2$ stores in the corresponding storage system a corresponding set of final time series, collectively referred to as $SET\_TH_2$.

In addition, for each flight of the helicopter $HC_1$, the processing system 10 of the helicopter $HC_1$ stores in the storage system 11 a respective flight data structure $FDS_1$; similarly, for each flight of the helicopter $HC_2$, the processing system of the helicopter $HC_2$ stores in the corresponding storage system 11 a respective flight data structure $FDS_2$.

The flight data structures $FDS_1$, $FDS_2$ have the same form, which is now described with reference to the flight data structure $FDS_1$ as an example.

As shown in FIG. 5, the flight data structure $FDS_1$ comprises a plurality of portions, which are referred to as the elementary data structures (indicated with DS).

Each elementary data structure DS is associated to a corresponding acquisition index; consequently, referring generically to the j-th elementary data structure $DS_j$, it is associated to the j-th acquisition index $AcqID_j$.

As shown in FIG. 6, which refers to the elementary data structure $DS_1$, and thus to the acquisition index $AcqID_1$, each elementary data structure $DS_j$ stores, for each time interval of duration $\Delta T$, a corresponding set of data, in the following indicated for brevity's sake as item $U_w$, wherein w indexes the items of the elementary data structure and therefore also the time intervals of duration $\Delta T$; for example, in FIG. 6 assumption is made that the elementary data structure $DS_1$ comprises thirty items $U_w$.

The item $U_w$ comprises a time interval indication (indicated with $T_w$), the acquisition index $acqID_j$ (for brevity's sake indicated in FIGS. 5 and 6 only by a number equal to index j), the set of health indexes associated with the acquisition index $AcqID_j$ and calculated on the basis of the corresponding primary signal acquired during said time interval, as well as the set of flight parameter values (indicated with $SET\_\Delta T_w$) acquired by means of the additional sensors 8 during such time interval, and more precisely during the temporal sub-domain to which the portion of the primary signal used to calculate the aforementioned set of health indexes associated with the acquisition index $AcqID_j$ refers.

In particular, the health indexes are columnarised in eighteen columns labelled as $HI_{x,1}$-$HI_x$, $18_{x,18}$ respectively, so that the elementary data structures DS of the flight data structure $FDS_1$ can also be columnarised, as shown in FIG. 5. The identification of each health index is made by replacing the parameter "x" with the value of the parameter j indexing the acquisition index $AcqID_j$ and thus the elementary data structure $DS_j$ (in the case of FIG. 6, we have x=j=1); moreover, within a generic u-th column (with u=1, ..., 18) of the j-th elementary data structure $DS_j$, the health indexes are indicated as $HI_{j,u}$ (w), wherein w indicates the time interval to which the health index refers, and therefore the item $U_w$ to which the health index belongs.

Again with reference to FIG. 5, as mentioned earlier, the columns in which the health indexes are stored are shared between the elementary data structures DS of the flight data structure $FDS_1$. Consequently, considering the u-th column, the meaning of the health indexes stored there varies along the column, as a function of the elementary data structures DS to which these health indexes belong.

FIG. 5 also shows how the elementary data structures relating to some acquisition indexes (for example, the second acquisition index $AcqID_2$) may not be included in the flight data structures $FDS_1$, for example because they are judged to be irrelevant or unreliable, the latter occurring for example in the case of malfunctioning of the sensor associated to the corresponding acquisition index. In the following, however, is assumed for simplicity's sake that no elementary data structure is discarded.

In addition, in the example shown in FIG. 5, it occurs that, net of any acquisition indexes not included in the flight data structure $FDS_1$, the elementary data structures $DS_1$-$DS_{44}$, relative respectively to the acquisition indexes $AcqID_1$-$AcqID_{44}$, form a first portion $P_1$ of the flight data structure $FDS_1$ and are relative to the synchronous processing 100, that is, they store acquisition indexes associated to sets of health indexes obtained by carrying out synchronous processing 100; the elementary data structures $DS_{45}$-$DS_{60}$, respectively relative to the acquisition indexes $AcqID_{45}$-$AcqID_{60}$, form a second portion $P_2$ of the flight data structure $FDS_1$ and are relative to the asynchronous processing 400, i.e. they store acquisition indexes associated to sets of health indexes obtained by carrying out asynchronous processing 400; the elementary data structures $DS_{61}$-$DS_{100}$, respectively relative to the acquisition indexes $AcqID_{61}$-$AcqID_{100}$, form a third portion $P_3$ of the flight data structure $FDS_1$ and are relative to the processing based on the time histories 300, that is they store acquisition indexes associated to sets of health indexes obtained by carrying out the processing based on the time histories 300; and finally, the elementary data structures $DS_{101}$-$DS_{180}$, respectively relative to the acquisition indexes $AcqID_{101}$-$AcqID_{180}$, form a fourth portion $P_4$ of the flight data structure $FDS_1$ and are relative to the envelope processing 200, i.e. they store acquisition indexes associated to sets of health indexes obtained by carrying out envelope processing 200.

Having said that, and as previously mentioned, having the aforementioned health indexes available, it is possible to detect possible malfunctions in the transmission system 1. For example, it is known to analyse health indexes in a deterministic way, e.g. by comparing them with corresponding thresholds (the latter pre-set, for example, manually), or by checking whether each health index complies with a corresponding rule. This approach is characterised by an exact knowledge of the rules/thresholds that are applied, but it is not very flexible and tends to generate a high number of false positives; moreover, this approach is affected by the dispersion induced on the health indexes by the different operating conditions of the transmission system.

SUBJECT AND SUMMARY OF THE INVENTION

Aim of the present invention is therefore to provide a method for detecting anomalies which allows to overcome at least in part the drawbacks of the prior art.

According to the present invention, there are provided a method and a system for detecting anomalies, as defined in the appended claims.

BRIEF DESCRIPTION OF THE DRAWINGS

For a better understanding of the present invention, embodiments thereof are now described, purely by way of non-limiting example, with reference to the accompanying drawings, in which:

FIG. 5 shows a flight data structure;

FIGS. 8 and 9 show diagrams of data structures relative to helicopter training flights;

FIGS. 10 and 11 show diagrams of data structures relative to unknown flights of the helicopter to which FIGS. 8 and 9 refer;

FIG. 13B shows an example of an output matrix generated by a classifier;

DETAILED DESCRIPTION OF PREFERRED EMBODIMENTS OF THE INVENTION

The present method is inspired by the possibility of having the aforementioned flight data structures available, which typically refer to helicopters that did not show any problems during the time periods to which the flight data structures refer; consequently, the health indexes and the flight parameter values contained in the flight data structures stored in the helicopter storage systems, as well as the final time series, typically refer to time periods in which the helicopters have functioned correctly.

Figure 1:
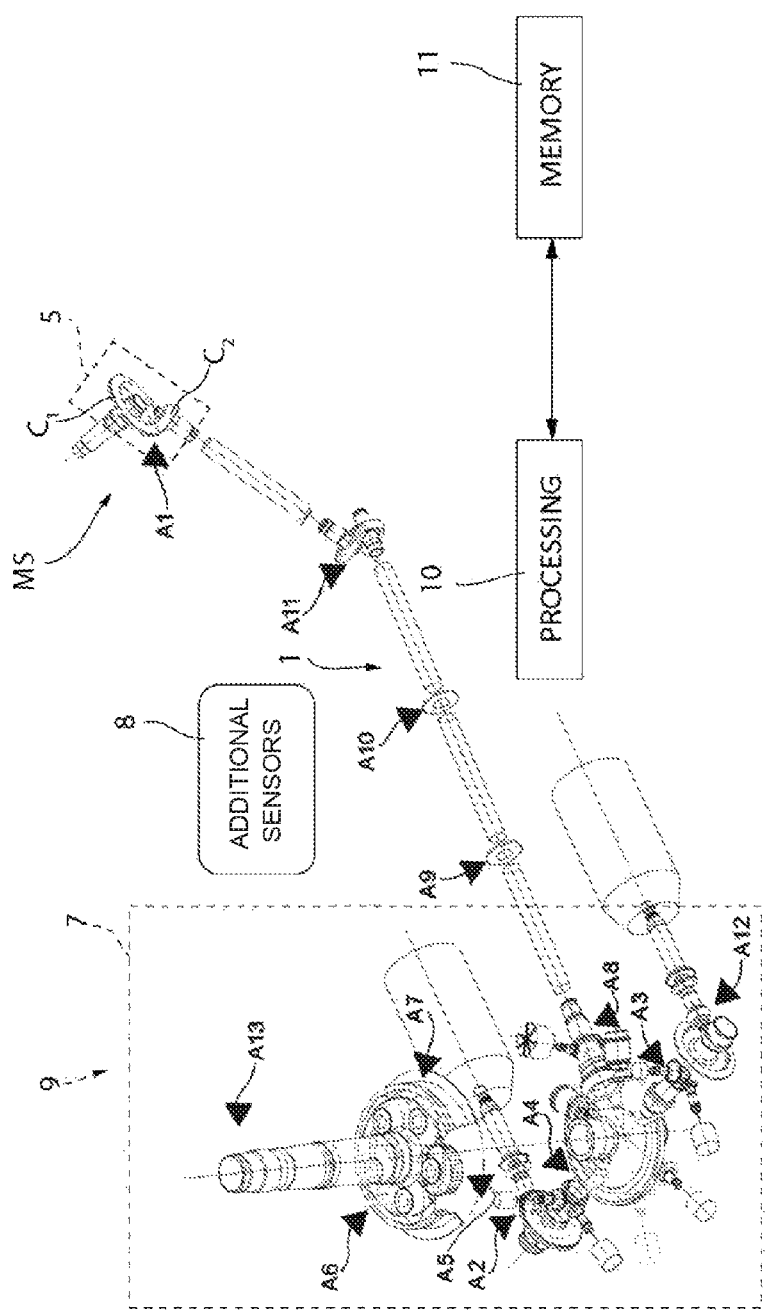
FIG. 1 shows schematically a perspective view of a transmission system.
Figure 2:
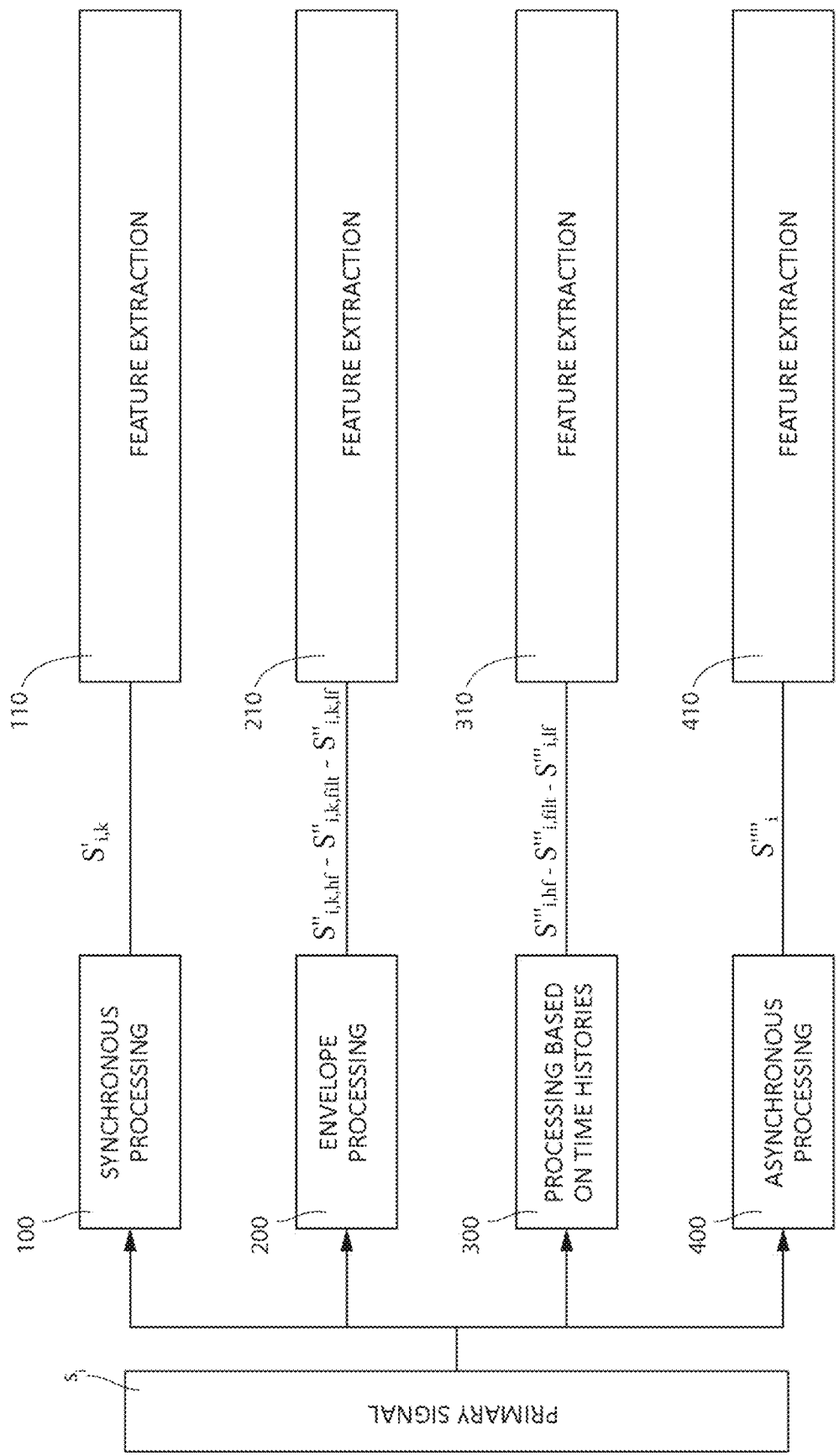
FIG. 2 shows a block diagram relative to signal processing operations.
Figure 3:
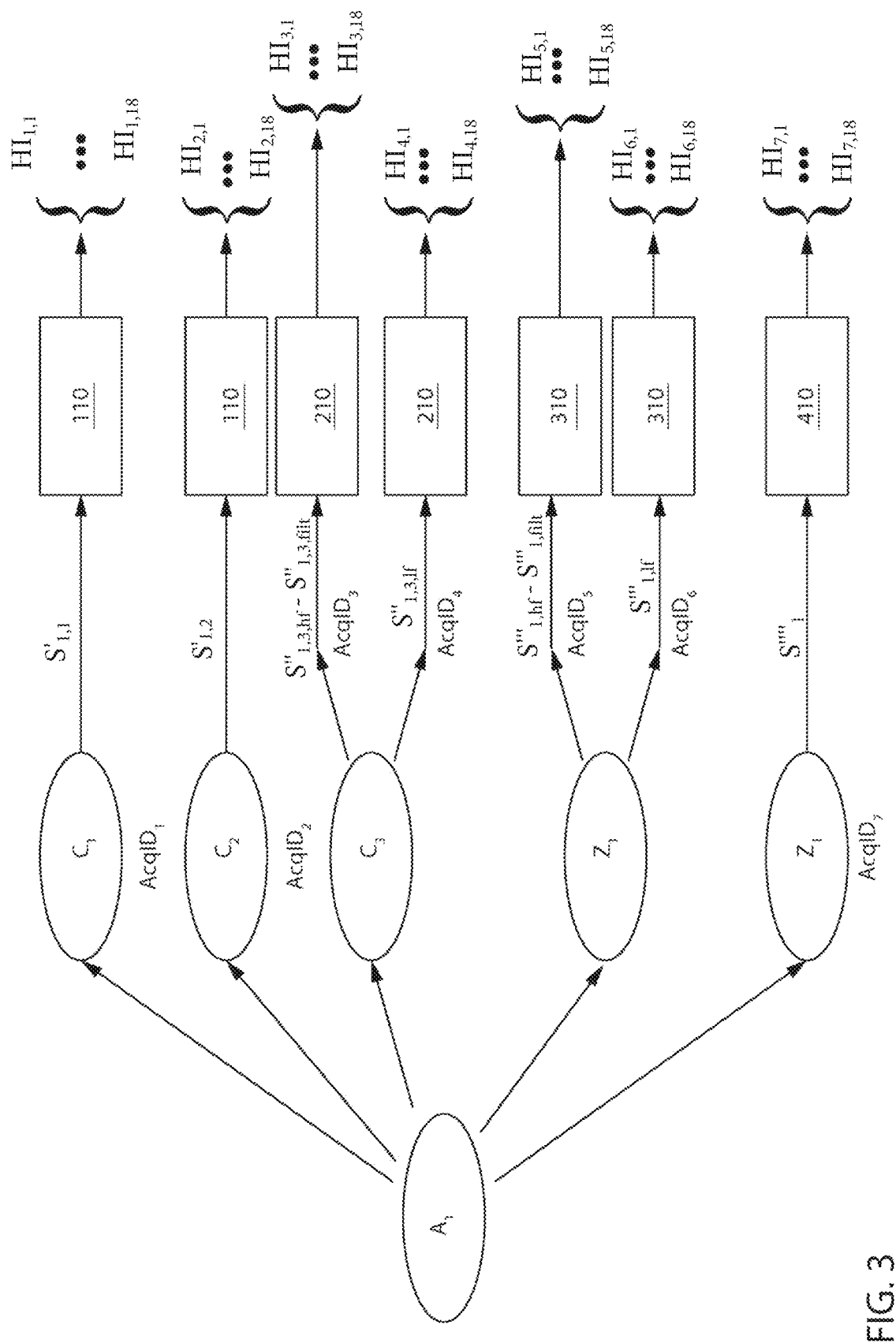
FIG. 3 shows a block diagram showing the relationships between a sensor, some components of the transmission system shown in FIG. 1 and corresponding health indexes.
Figures 4, 6:
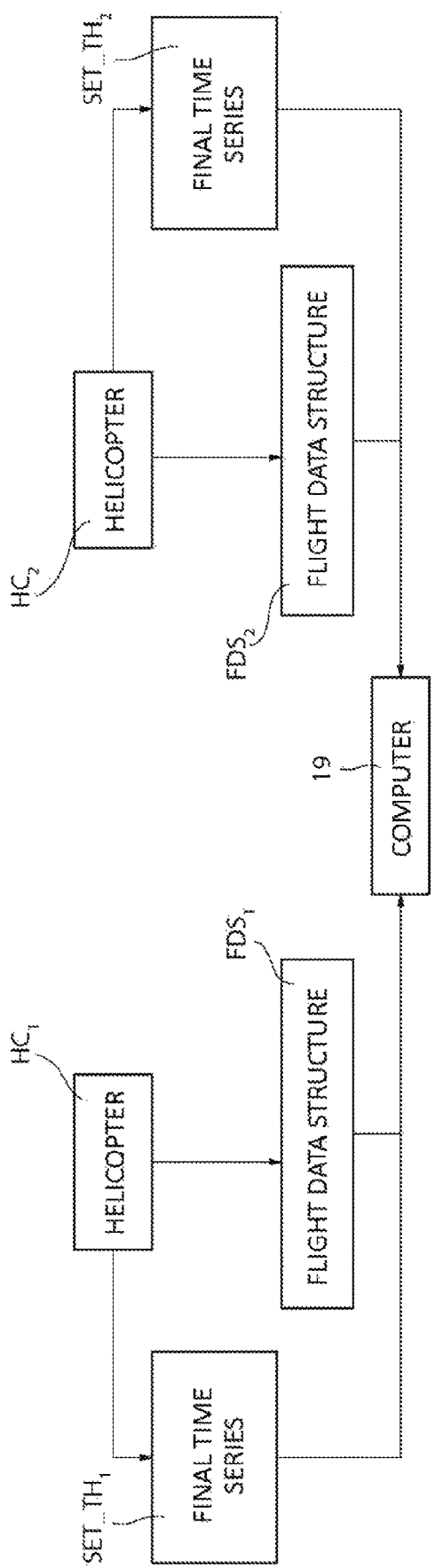
FIG. 4 shows a block diagram showing the relationships between two helicopters and corresponding data structures.
FIG. 6 shows in detail a portion of the flight data structure shown in FIG. 5.

That being said, the present method can be carried out by a computer 19 (shown schematically in FIG. 4) which is provided with the flight data structures FDS relating to the flights of a number of helicopters. Furthermore, the computer 19 is provided, for each flight of each helicopter, with the corresponding set of final time series SET_TH, relating to the last time interval of duration $\Delta T$ of the flight of the helicopter.

In the following, the method is described, without loss of generality, with reference to the helicopter $HC_1$ only. As described below, the method provides, among other things, training a plurality of classifiers on the basis of the flight data structures $FDS_1$ relating to several flights of the helicopter $HC_1$, assuming that the transmission system 1 of the helicopter $HC_1$ has functioned correctly during these flights. To this end, in the following, it is assumed that each flight data structure $FDS_1$ includes elementary data structures $DS_j$ relating to, for example, one hundred and eighty acquisition indexes $AcqID_j$ (with j=1, . . . , 180); moreover, it is assumed, purely by way of example, that the sets of flight parameter values SET_$\Delta T$ (shown in FIG. 6) are formed by vectors of eighteen elements, i.e. it is assumed that the flight parameters are eighteen in number; consequently, leaving aside the indications relative to the acquisition index $AcqID_j$ and to the time interval, each item $U_w$ of each elementary data structure $DS_j$ of each flight data structure $FDS_1$ is a vector of thirty-six elements. In the following, the eighteen flight parameters are indicated individually with $FP_1, \ldots, FP_{18}$.

Figure 7:
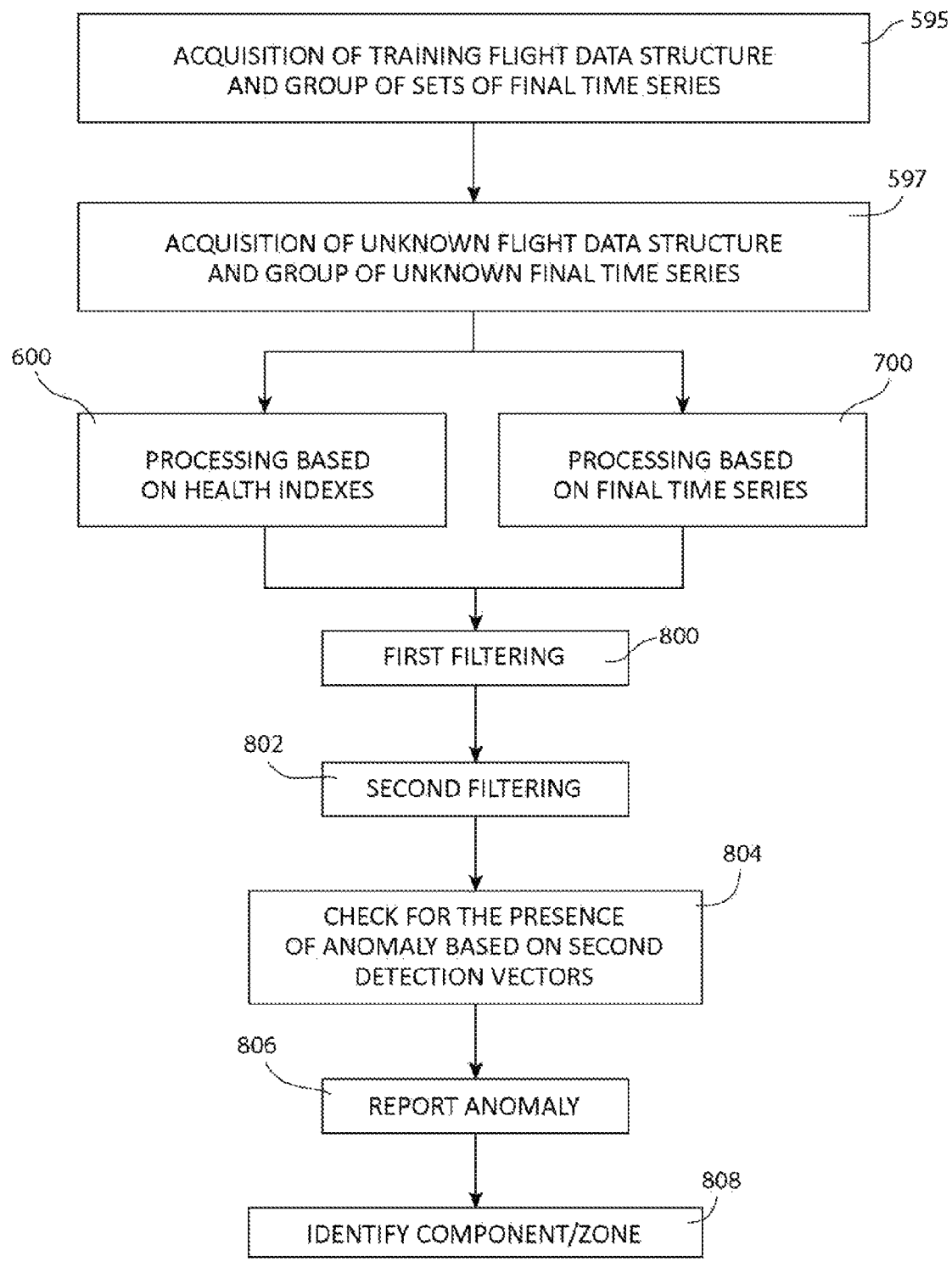
FIGS. 7, 12, 14, 15 and 17 shows a block diagram relative to operations according to the present method.

In detail, as shown in FIG. 7, the method provides acquiring and merging, by the computer 19, flight data structures $FDS_1$ relating to flights of the helicopter $HC_1$ in which the transmission system 1 has functioned correctly. In this way, the computer 19 acquires an aggregate flight data structure, which in the following is referred to as the training flight data structure M_$FDS_1$, which has the same structure as the flight data structure $FDS_1$ and thus comprises one hundred and eighty elementary data structures, again indicated with DS.

Figure 8:
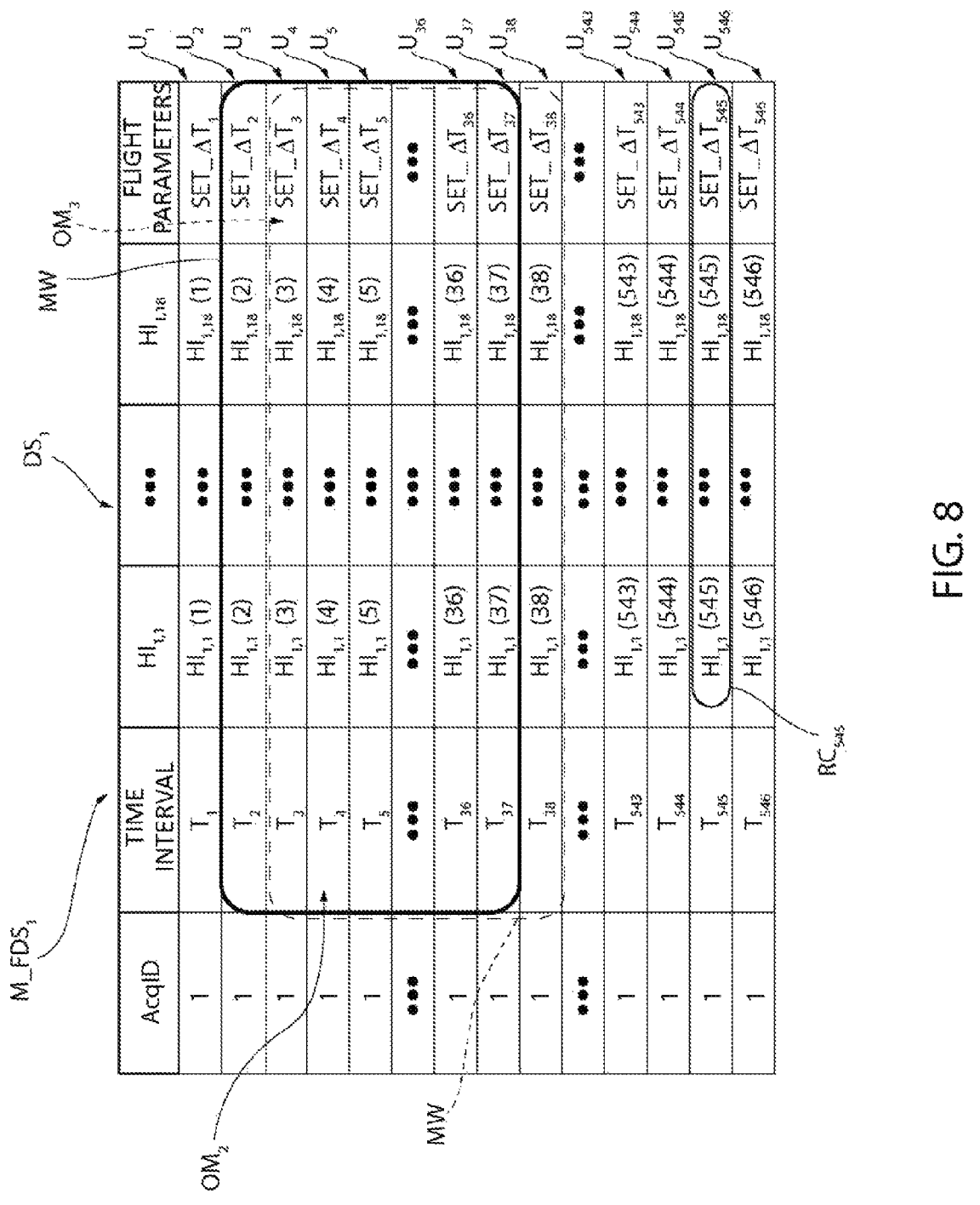

For example, FIG. 8 shows the elementary data structure $DS_1$ of the training flight data structure M_$FDS_1$, which is obtained by aggregating (i.e., by columnarising in succession) the elementary data structures DS of the flight data structures $FDS_1$ relating to flights of the helicopter $HC_1$, so that the elementary data structure $DS_1$ of the training flight data structure M_$FDS_1$ comprises all items $U_w$ of the elementary data structures $DS_1$ of the flight data structures $FDS_1$ relating to flights of the helicopter $HC_1$, columnarised together.

In particular, with reference to a succession of flights of the helicopter $HC_1$, the elementary data structures $DS_1$ of the flight data structures $FDS_1$ relative to flights of the helicopter $HC_1$ are columnarised in sequence, in the same temporal order in which the flights of the helicopter $HC_1$ took place; in this way, the indications of the time intervals of the items $U_w$ of the elementary data structure $DS_1$ of the training flight data structure M_$FDS_1$ define a monotonic temporal succession. The same considerations apply to any generic j-th elementary data structure $DS_j$ of the training flight data structure M_$FDS_1$.

By way of example only, each elementary data structure $DS_j$ of the training flight data structure $M\_FDS_1$ comprises five hundred and forty-six items $U_w$, which are still indexed by the index w, with w=1, . . . , 546.

In addition, the method provides that the computer 19 acquires, for each of the aforementioned flights of the helicopter $HC_1$ in which the transmission system 1 has functioned correctly, also the corresponding set of final time series $SET\_TH_1$. In this way, the computer 19 is provided with the sets of the final time series $SET\_TH_1$ relating to the aforementioned flights of the helicopter $HC_1$, which are referred to in the following as the group of sets of final time series $M\_SET\_TH_1$, an example of which is schematically shown in FIG. 9. In this example, the individual sets of the final time series $SET\_TH_1$ are indicated with $SET\_TH_{1,m}$, with m=1, . . . , Nf. Furthermore, the single final time series of the moth set are indicated with $TH_{1,1}(m)$-$TH_{1,Pmax}(m)$ and are associated with the time interval to which these final time series refer.

Again with reference to FIG. 7, the operations that led to the acquisition, by the computer 19, of the training flight data structure $M\_FDS_1$ and of the group of sets of final time series $M\_SET\_TH_1$ are indicated with 595.

Furthermore, the present method provides analysing a number of unknown flights of the helicopter $HC_1$, i.e. a number of flights following the aforementioned flights of the helicopter $HC_1$, of which it is not known a priori whether the transmission system 1 has functioned correctly. With respect to this number of unknown flights, the computer 19 acquires, in the same manner as described with respect to block 595, a flight data structure $M\_FDS_x$, which is hereinafter referred to as the unknown flight data structure $M\_FDS_x$, and a group of sets of final time series $M\_SET\_TH_x$, which is hereinafter referred to as the group of sets of final unknown time series $M\_SET\_TH_x$.

Figures 10, 13B:
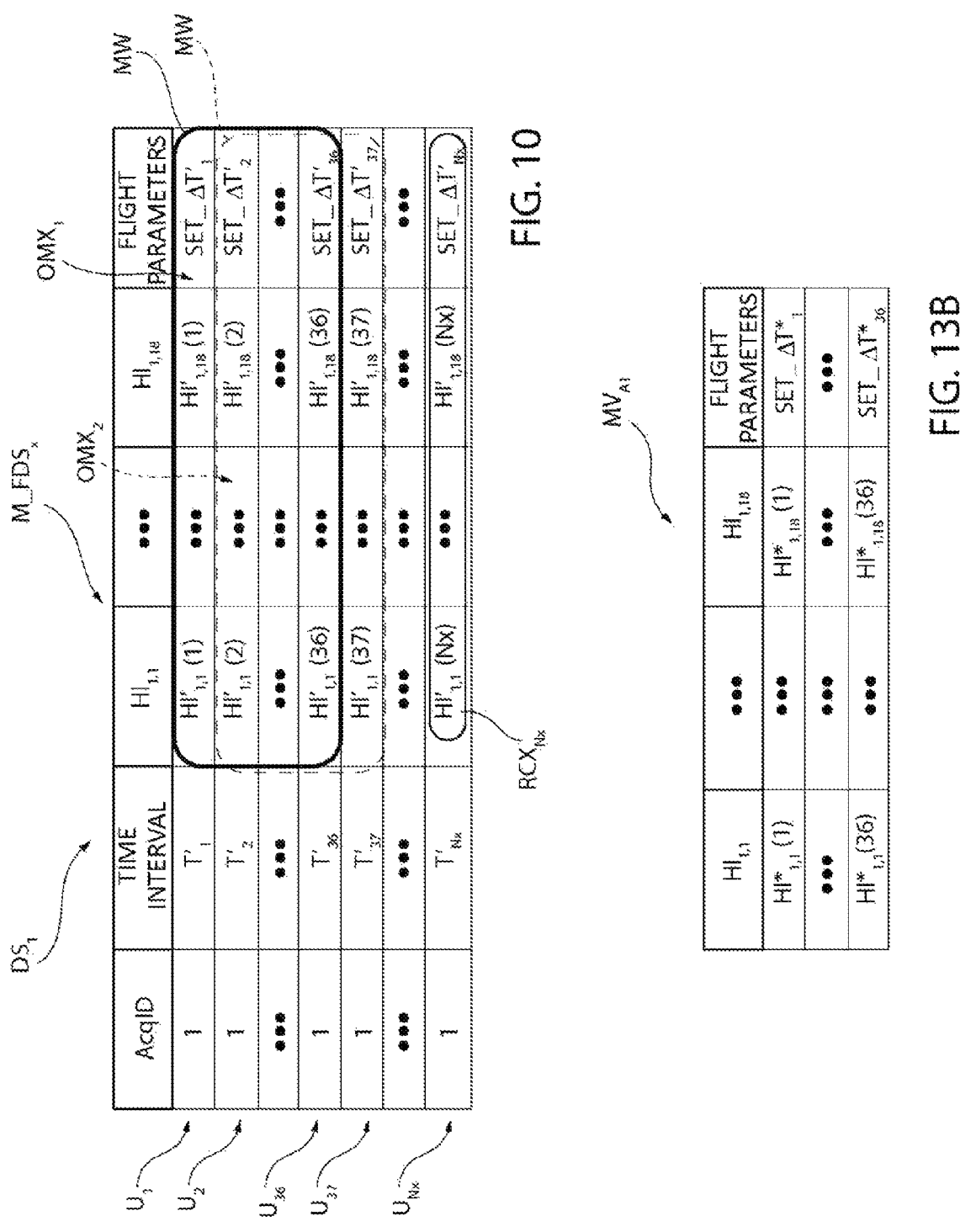

FIG. 10 shows an example of the elementary data structure $DS_1$ relating to the unknown flight data structure $M\_FDS_x$, which is assumed to include a number of items $U_w$ equal to Nx; the health indexes are indicated in the same way as in FIG. 8, but with the addition of a superscript, as are the sets of flight parameters. FIG. 11 shows an example of the group of sets of final unknown time series $M\_SET\_TH_x$, wherein the sets of final unknown time series are indicated with $SET\_TH_{x,m}$, with m=1, . . . , Nfx; in addition, the single final unknown time series are indicated with $TH'_{1,1}(m)$-$TH'_{1,Pmax}(m)$ and are associated with the time interval to which these final unknown time series refer.

Again with reference to FIG. 7, the operations that led to the acquisition of the unknown flight data structure $M\_FDS_x$ and to the group of sets of final unknown time series $M\_SET\_TH_x$ are indicated with 597.

The present method further provides performing a processing (block 600) based on the health indexes stored in the training flight data structure $M\_FDS_1$ and in the unknown flight data structure $M\_FDS_x$ and a processing (block 700) based on the group of sets of final time series $M\_SET\_TH_1$ and on the group of sets of final unknown time series $M\_SET\_TH_x$.

Figure 12:
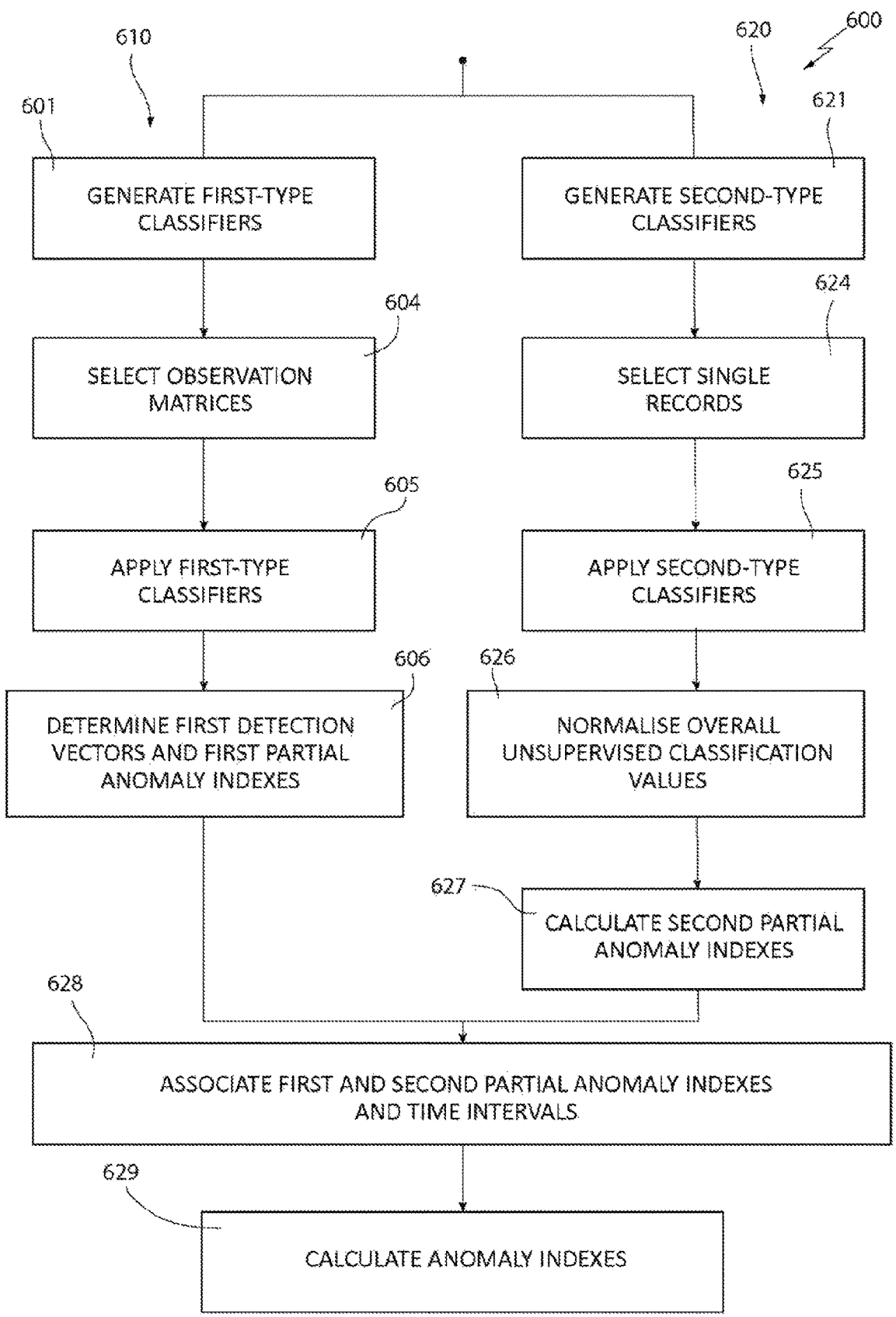

In more detail, as shown in FIG. 12, processing 600 based on the health indexes provides performing a first and second classification 610, 620, as described hereinbelow.

In particular, the first classification 610 comprises generating (block 601), for each acquisition index $AcqID_j$, a corresponding first-type classifier (shown symbolically in FIG. 13A, where it is indicated with $AE_j$), which is an autoencoder type classifier.

Figure 14:
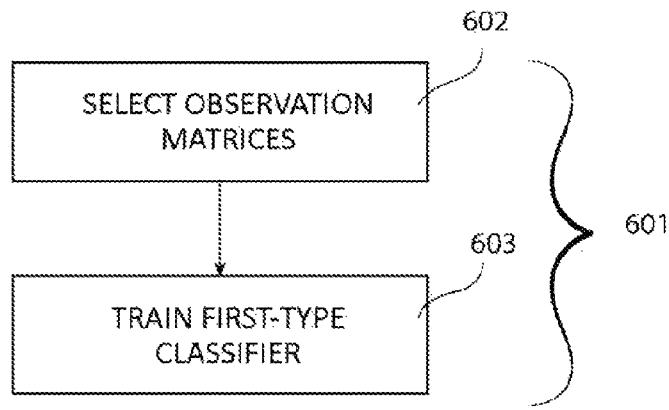

For example, referring to the acquisition index $AcqID_1$, computer 19 performs the operations shown in FIG. 14. In particular, the computer 19 selects (block 602), starting from the elementary data structure $DS_1$ of the training flight data structure $M\_FDS_1$, a plurality of observation matrices OM, as shown in FIG. 8.

For example, each observation matrix OM may be formed by the health indexes and by the sets of values of the flight parameters of thirty-six consecutive items $U_w$ of the elementary data structure $DS_1$ of the training flight data structure $M\_FDS_1$, i.e. it may have a square shape, since, as explained above, by way of example only, it has been assumed that, referring to the generic item $U_w$, it comprises the eighteen health indexes $HI_{1,1}(w)$-$HI_{1,18}(w)$ and the eighteen flight parameter values $FP_1$-$FP_{18}$ of the set $SET\_\Delta T_w$.

Still by way of example, the selection of the observation matrices OM may take place through the use of a mobile window MW (shown in FIG. 8), which is translated along the elementary data structure $DS_1$ of the training flight data structure $M\_FDS_1$, with a step equal to a single item $U_w$ and has precisely the dimension of thirty-six items per thirty-six elements (eighteen health indexes and eighteen flight parameters); in this case, for each position assumed by the mobile window MW with respect to the elementary data structure $DS_1$, the mobile window MW selects a corresponding portion of the elementary data structure $DS_1$ of the training flight data structure $M\_FDS_1$, the selected portion forming a corresponding observation matrix OM.

In particular, FIG. 8 shows the mobile window MW in the respective second position (in solid line) and in the respective third position (in broken line), in which it allows the selection, respectively, of a pair of observation matrices indicated with $OM_2$ and $OM_3$.

In the following, referring to the generic item $U_w$ of the elementary data structure $DS_j$ relating to the j-th acquisition index AcqIDj of the training flight data structure $M\_FDS_1$, reference is made to the corresponding record $RC_w$ to indicate the set of the eighteen health indexes $HI_{j,1}(w)$-$HI_{j,18}(w)$ and of the eighteen flight parameter values $FP_1$-$FP_{18}$ of the set $SET\_\Delta T_w$.

Subsequently, for each acquisition index $AcqID_j$, the computer 19 trains (block 603, FIG. 14) the first-type classifier $AE_j$ on the basis of the observation matrices OM selected starting from the corresponding elementary data structure $DS_j$ of the training flight data structure $M\_FDS_1$, in a per se known manner. In this regard, being an autoencoder-type classifier, each first-type classifier $AE_j$ comprises a number of inputs, for example, equal to thirty-six (that is, equal to the dimensions of each observation matrix OM), a number of outputs equal to the number of inputs and a number of hidden layers, for example, equal to five; for simplicity's sake, it is assumed that this number of inputs and the number of hidden layers do not vary as the acquisition index AcqID; varies. Furthermore, in a per se known manner, the first-type classifier $AE_j$ is defined by a plurality of weights, relating to the links present between inputs, outputs and hidden layers. Consequently, the training of each first-type classifier $AE_j$ on the basis of the corresponding observation matrices OM previously selected provides iteratively refining the values of the weights.

In practice, for each acquisition index $AcqID_j$, the corresponding first-type classifier $AE_j$ is trained to be a function also of the evolution over time of the health indexes $HI_{j,1}$-$HI_{j,18}$ that are relative to this acquisition index $AcqID_j$, as well as the evolution over time of the values of the flight parameter sets $SET\_\Delta T$.

Again with reference to FIG. 12, the second classification 620 comprises generating (block 621), for each acquisition index $AcqID_j$, a first, a second, a third and a fourth corresponding second-type classifier (shown symbolically in FIG. 13A, where they are indicated respectively with $DBUC1_j$, $DBUC2_j$, $DBUC3_j$ and $DBUC4_j$), which are of unsupervised type.

In particular, in the following assumption is made that the first and the second second-type classifier $DBUC1_j$, $DBUC2_j$ are respectively an "isolation forest" type (iFOREST) classifier and an "angle-based" outlier detection (ABOD) classifier; furthermore, assumption is made that the third and the fourth second-type classifier $DBUC3_j$, $DBUC4_j$ are respectively a "K-nearest neighbours" (K-NN) classifier and a "local outlier factor" (LOF) classifier.

Figure 15:
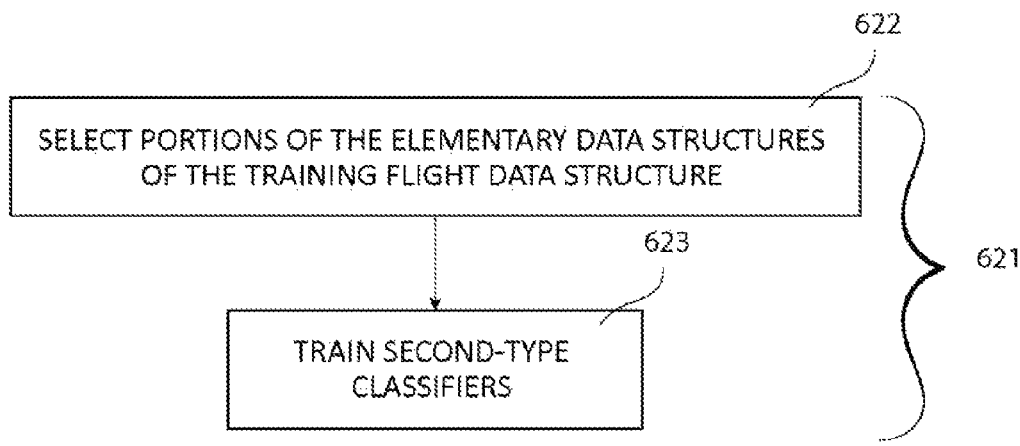

For example, referring to the acquisition index $AcqID_1$, computer 19 performs the operations shown in FIG. 15. In particular, the computer 19 selects (block 622) the portion of the elementary data structure $DS_1$ of the training flight data structure $M\_FDS_1$ that includes the health indexes $HI_{1,1}$-$HI_{1,18}$ and the sets of flight parameter values $SET\_\Delta T$, then discards the indications relating to the time intervals and to the acquisition index $AcqID_1$. In practice, considering the example shown in FIG. 8, the portion of the elementary data structure $DS_1$ of the training flight data structure $M\_FDS_1$ selected by the computer 19 has dimensions equal to five hundred and forty-six per thirty-six.

Subsequently, referring for example again to the acquisition index $AcqID_1$, in a per se known manner, the computer 19 trains (block 623) each of the first, the second, the third and the fourth second-type classifier $DBUC1_1$, $DBUC2_1$, $DBUC3_1$, $DBUC4_1$ relating to the acquisition index $AcqID_1$, on the basis of the selected portion of the elementary data structure $DS_1$ of the training flight data structure $M\_FDS_1$, which represents a set of training data; the health indexes $HI_{1,1}(w)$-$HI_{1,18}(w)$ and the sets of the flight parameter values $SET\_\Delta T_w$ of each w-th item $U_w$ of the elementary data structure $DS_1$ (i.e., each record $RC_w$) represent a corresponding basic unit of this training data set.

In this way, each of the first, the second, the third and the fourth second-type classifier $DBUC1_1$, $DBUC2_1$, $DBUC3_1$, $DBUC4_1$ relating to the acquisition index $AcqID_1$ determines, in a per se known manner, the statistical properties characterising the so-called healthy distribution, i.e. the statistical properties of the set of records $RC_w$ employed during the training.

In more detail, the first and the fourth second-type classifiers $DBUC1_j$, $DBUC4_j$ are so-called "density-based" classifiers, i.e. they are classifiers that detect high and low density zones of the training data set and classify as anomalies the input vectors that fall within low density zones. The second and the third second-type classifiers $DBUC2_j$, $DBUC3_j$ are "distance-based" classifiers, i.e. they are classifiers that determine the centre of the cluster formed by the set of the training data and classify as anomalies the input vectors that are farther than a certain distance from this centre.

In addition, for each acquisition index $AcqID_j$, the corresponding first, second, third and fourth second-type classifier $DBUC1_j$, $DBUC2_j$, $DBUC3_j$, $DBUC4_j$ are trained independently from the time evolution of the health indexes $HI_{j,1}(w)$-$HI_{j,18}(w)$ relating to that acquisition index $AcqID_j$, as well as independently from the time evolution of the values of the flight parameter sets $SET\_\Delta T_w$.

Again with reference to FIG. 12, the first classification 610 envisages performing the following operations after performing the operations referred to in block 601.

In detail, for each acquisition index $AcqID_j$, the computer 19 selects (block 604), starting from the elementary data structure $DS_j$ relating to the acquisition index $AcqID_j$ of the unknown flight data structure $M\_FDS_x$, a plurality of respective observation matrices OMX, in the same way as described with reference to the elementary data structure $DS_j$ relating to the acquisition index $AcqID_j$ of the training flight data structure $M\_FDS_1$, therefore by translating the aforementioned mobile window MW along the elementary data structure $DS_j$ of the unknown flight data structure $M\_FDS_x$, with a step equal to a single item U. In this way, for each position assumed by the mobile window MW with respect to the elementary data structure $DS_j$ of the unknown flight data structure $M\_FDS_x$, the mobile window MW selects a corresponding portion of the elementary data structure $DS_j$ of the unknown flight data structure $M\_FDS_x$, which forms a corresponding observation matrix OMX.

Each observation matrix OMX selected from the elementary data structure $DS_j$ of the unknown flight data structure $M\_FDS_x$ has dimensions equal to thirty-six per thirty-six. In the following, observation matrices OMX selected starting from the elementary data structure $DS_j$ of the unknown flight data structure $M\_FDS_x$ are referred to the unknown observation matrices OMX; furthermore, the records of the unknown flight data structure $M\_FDS_x$ are indicated with RCX.

Two examples of unknown observation matrices, indicated respectively with $OMX_1$, $OMX_2$ and relating to the acquisition index $AcqID_1$ are shown in FIG. 10; they correspond to the selections made by the mobile window MW when it assumes the first position (in solid line) and the second position (in broken line), respectively.

Subsequently, for each acquisition index $AcqID_j$, the computer 19 applies (block 605, FIG. 12) the corresponding first-type classifier $AE_j$ to the corresponding unknown observation matrices OMX, selected starting from the elementary data structure $DS_j$ of the unknown flight data structure $M\_FDS_x$, so as to obtain, for each of these unknown observation matrices OMX, a corresponding output matrix $MV_{Aj}$.

An example of an output matrix $MV_{Aj}$ is shown in FIG. 13B, with respect to the acquisition index $AcqID_1$ (in this example, the values of the health indexes and of the sets of flight parameter values contained in the output matrix $MV_{A1}$ are marked with an asterisk).

The output matrix $MV_{Aj}$ may be obtained for example by initial generation, by the first-type classifier $AE_j$ and as a function of the unknown observation matrix OMX, of a reconstructed matrix (not shown) having the same dimensions as the unknown observation matrix OMX, and subsequent calculation of the difference between the reconstructed matrix and the unknown observation matrix OMX; in this way, the output matrix $MV_{Aj}$ is formed by thirty-six per thirty-six elements, each of which is equal to a respective value, which represents a kind of elementary reconstruction error and is indicative of the probability that the corresponding element of the unknown observation matrix OMX is anomalous with respect to the training of the first-type classifier $AE_j$.

Then, starting from each output matrix $MV_{Aj}$, computer 19 determines (block 606) a corresponding first detection vector $V_{Aj}$, obtained by column-wise sum of the elements of the output matrix $MV_{Aj}$, such that the first detection vector $V_{Aj}$ is formed by thirty-six elements; in addition, the computer 19 calculates, for each output matrix $MV_{Aj}$, a corresponding first partial anomaly index $ANV1_j$, as explained below.

Figure 16:
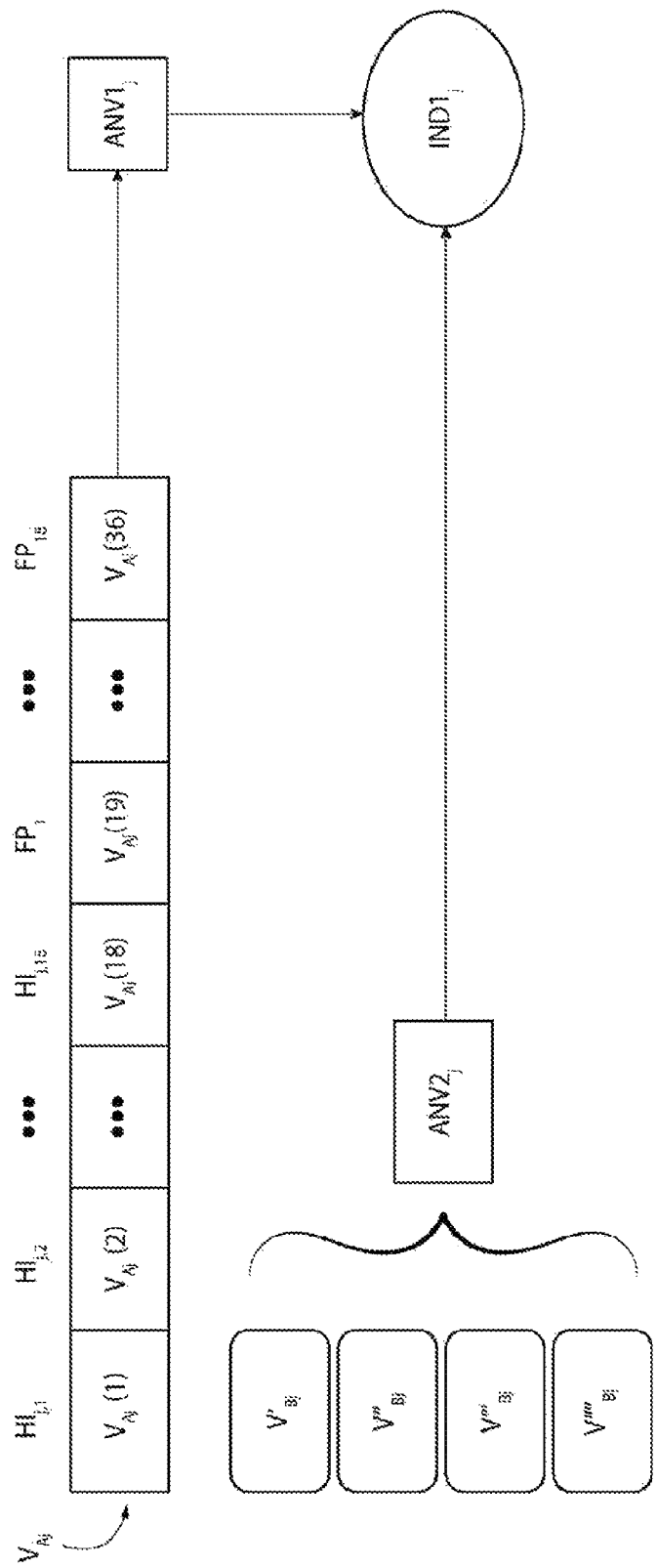
FIGS. 16 and 20 show block diagrams relative to data vectors generated according to the present method.

In particular, again with reference to the generic j-th acquisition index $AcqID_j$, each first detection vector $V_{Aj}$ is formed by respective thirty-six elements, each of which is respectively associated to a corresponding health index $HI_{j,1}$-$HI_{j,18}$ or to a corresponding flight parameter $FP_1$-$FP_{18}$. An example of the first detection vector $V_{Aj}$ is shown in FIG. 16; furthermore, the numerical values of the thirty-six elements $V_{Aj}(1), \ldots, V_{Aj}(36)$ of the first detection vector $V_{Aj}$ are shown symbolically in FIG. 16. In addition, FIG. 16 shows the associations present between each of the thirty-six elements $V_{Aj}(1), \ldots, V_{Aj}(36)$ of the first detection vector $V_{Aj}$ and the corresponding health index $HI_{j,1}$-$HI_{j,18}$ or flight parameter $FP_1$-$FP_{18}$.

In more detail, each of the thirty-six elements $V_{Aj}(1), \ldots, V_{Aj}(36)$ of the first detection vector $V_{Aj}$ has a value that represents a corresponding anomaly estimate, since it is indicative of the probability that the thirty-six values of the corresponding health index $HI_{j,1}$-$HI_{j,18}$ or flight parameter $FP_1$-$FP_{18}$ contained in the unknown observation matrix OMX to which the first-type classifier $AE_j$ has been applied exhibit anomalous behaviour compared to the training to which the first-type classifier $AE_j$ has been subjected. Furthermore, the first detection vector $V_{Aj}$ can be associated, for example, with the time interval to which the first record RCX of the unknown observation matrix OMX refers.

In addition, for each first detection vector $V_{Aj}$, the corresponding first partial anomaly index $ANV1_j$ is calculated by summing the values of the thirty-six elements of the first detection vector $V_{Aj}$; in this way, the first partial anomaly index $ANV1_j$ is indicative of the probability that the unknown observation matrix OMX is, overall, anomalous and is associated with the same time interval as the first detection vector $V_{Aj}$.

Again with reference to FIG. 12, the second classification 620 envisages performing the following operations after performing the operations referred to in block 621.

In detail, for each acquisition index $AcqID_j$, the computer 19 selects (block 624), starting from the elementary data structure $DS_j$ relative to the acquisition index $AcqID_j$ of the unknown flight data structure $M\_FDS_x$, single records RCX of this elementary data structure $DS_j$.

Figure 13A:
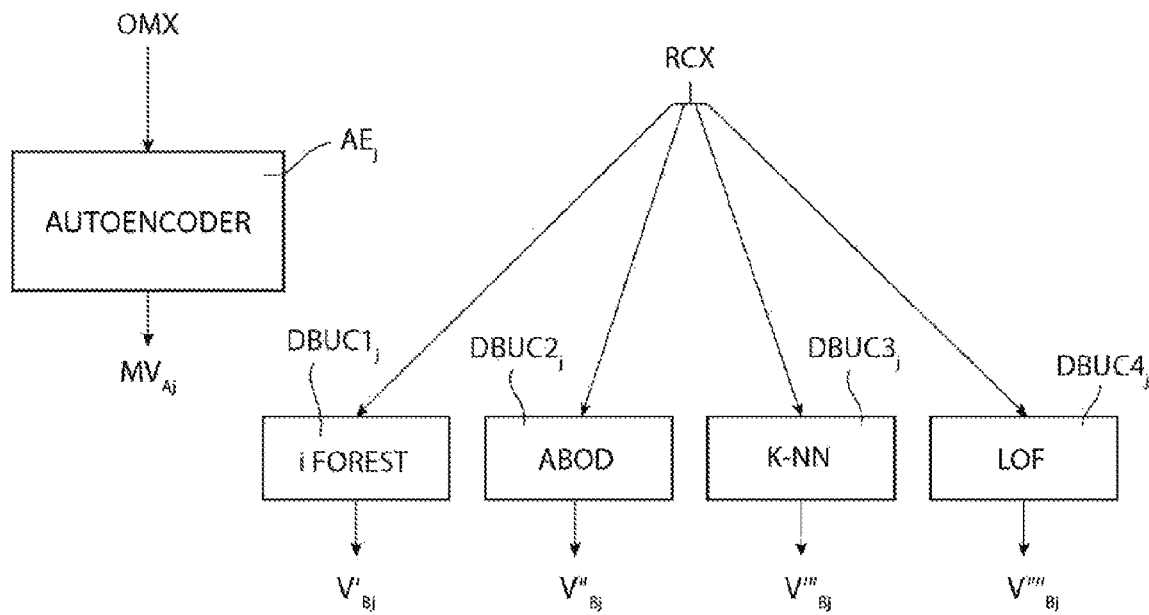
FIGS. 13A and 19 show block diagrams of classification operations.

Subsequently, the computer 19 applies (block 625) to each of the selected records RCX the first, the second, the third and the fourth second-type classifier DBUC1j, DBUC2$_j$, DBUC3; and DBUC4; relating to the acquisition index $AcqID_j$, so as to obtain, respectively, a first, a second, a third and a fourth value $V'_{Bj}$, $V''_{Bj}$, $V'''_{Bj}$ and $V''''_{Bj}$, to which reference is made respectively as the first, second, third and fourth overall unsupervised classification value $V'_{Bj}$, $V''_{Bj}$, $V'''_{Bj}$ and $V''''_{Bj}$, as shown qualitatively in FIG. 13A.

Considering each of the aforementioned first, second, third and fourth overall unsupervised classification values $V'_{Bj}$, $V''_{Bj}$, $V'''_{Bj}$ and $V''''_{Bj}$, it is a value that represents a corresponding anomaly estimate, since it is indicative of the probability, estimated by the corresponding second-type classifier, that the record RCX is overall anomalous with respect to the training to which said corresponding second-type classifier has been subjected.

Then, for each record RCX, the computer 19 performs a normalization (block 626, FIG. 12; optional) of the corresponding first, second, third and fourth overall unsupervised classification values $V'_{Bj}$, $V''_{Bj}$, $V'''Bj$ and $V''''_{Bj}$ (e.g., by subtraction of the mean and subsequent division of the result by the standard deviation) and subsequently calculates (block 627) a corresponding second partial anomaly index $ANV2_j$ (an example shown in FIG. 16), as a function of the corresponding first, second, third and fourth overall unsupervised classification value $V'_{Bj}$, $V''_{Bj}$, $V'''_{Bj}$ and $V''''_{Bj}$, e.g. by averaging them.

Since different second-type classifiers may have varying reliability (i.e., ability to detect anomalies), depending on the type of anomaly occurring, each second partial anomaly index $ANV2_j$ is more likely to correctly indicate the occurrence of an anomaly than the corresponding first, second, third and fourth overall unsupervised classification value $V'_{Bj}$, $V''_{Bj}$, $V'''_{Bj}$ and $V''''_{Bj}$. Furthermore, each second partial anomaly index $ANV2_j$ is associated with the time interval to which the corresponding record RCX refers.

Again with reference to FIG. 12, the computer 19 associates (block 628) the first partial anomaly indexes $ANV1_j$ obtained by carrying out the operations referred to in block 606 with corresponding second partial anomaly indexes $ANV2_j$ obtained by carrying out the operations referred to in block 627, possibly after carrying out further normalisation operations of the first and second partial anomaly indexes $ANV1_j$, $ANV2_j$. In general, the exact mechanism of association is irrelevant for the purposes of the present invention.

For example, considering any acquisition index $AcqID_j$ and considering any second partial anomaly index $ANV2_j$ calculated starting from a certain record RCX of the elementary data structure $DS_j$ of the unknown flight data structure $M\_FDS_x$, and thus associated to the time interval to which the corresponding record RCX refers, this second partial anomaly index $ANV2_j$ may be associated with the first partial anomaly index $ANV1_j$ which results to be associated with the same time interval to which the aforementioned certain record RCX refers, i.e. with the first partial anomaly index $ANV1_j$ which has been calculated starting from the unknown observation OMX which matrix in the aforementioned certain record RCX occupies the first row of the unknown observation matrix OMX.

The computer 19 further associates to each pair formed by a first and a second partial anomaly index $ANV1_j$, $ANV2_j$ associated between them a corresponding time interval, which may for example be equal to the time interval relating to the record RCX on the basis of which the second partial anomaly index $ANV2_j$ was calculated, which, as mentioned, coincides with the time interval associated with the first detection vector $V_{Aj}$ on the basis of which the first partial anomaly index $ANV1_j$ was calculated.

Again with reference to the aforementioned association operation, it may result, depending on the position of the aforementioned predetermined row, in that some second partial anomaly indexes $ANV2_j$ cannot be associated with any corresponding first partial anomaly index $ANV1_j$, e.g. because said second partial anomaly indexes $ANV2_j$ are relative to the last thirty-five records RCX of the elementary data structure $DS_j$ of the unknown flight data structure $M\_FDS_x$, in which case they may for example be discarded. These details are however irrelevant for the purpose of this method.

Then, the computer 19 calculates (block 629), for each pair formed by a first and a second partial anomaly index $ANV1_j$, $ANV2_j$ associated with each other, a corresponding anomaly index $IND1_j$ (one shown in FIG. 16), which is relative to the j-th acquisition index $AcqID_j$ and is equal to an average of the first and the second partial anomaly index $ANV1_j$, $ANV2_j$ associated with each other. The anomaly index $IND1_j$ is also associated with the time interval associated with the pair formed by the first and second partial anomaly index $ANV1_j$, $ANV2_j$, which is referred to in the following as the time interval $TV1_j$.

The anomaly index $IND1_j$ is equal to a value that represents a refined estimate of the probability that an anomaly has occurred, since it benefits from the different capabilities of detecting anomalies that characterise the first and the second classification 610, 620 respectively. Furthermore, the anomaly index $IND1_j$ is associated with the corresponding first detection vector $V_{Aj}$, i.e. the first detection vector $V_{Aj}$ used to calculate the first partial anomaly index $ANV1_j$, whose thirty-six elements, as previously mentioned, are such that each of them represents an estimate of whether any anomaly is attributable to the corresponding health index $HI_{j,1}$-$HI_{j,18}$ or flight parameter $FP_1$-$FP_{18}$.

Again with reference to FIG. 7, the aforementioned processing 700 based on the sets of the final time series is described below with reference to any of the final time series $TH_p$ (with p ranging between 1 and Pmax); however, the operations are iterated for all final time series $TH_1$-$TH_{Pmax}$.

Figure 17:
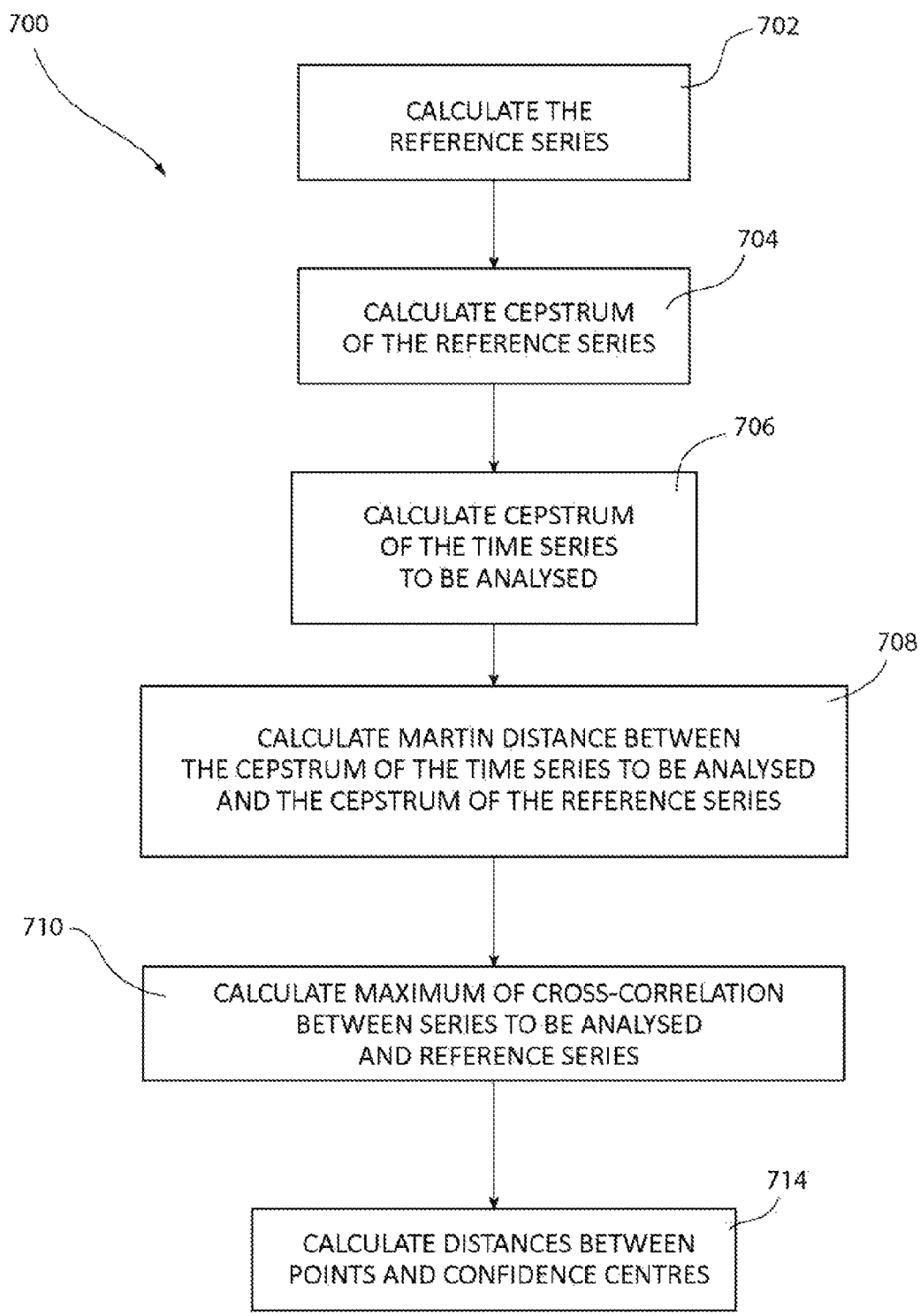

As shown in FIG. 17, the computer 19 calculates (block 702) a corresponding reference series $REF\_TH_p$, e.g. by averaging the final time series $TH_{1,p}$ stored in the p-th column of the group of sets of final time series $M\_SET\_TH_1$ shown in FIG. 9.

Next, the computer 19 calculates (block 704) the so-called cepstrum (e.g. of order fifteen, i.e. including fifteen values) of the reference series $REF\_TH_p$.

Then, for each of the sets of final unknown time series $SET\_TH_{x,1}$-$SET\_TH_x$, Nfx of the group of sets of final unknown time series $M\_SET\_TH_x$, the computer 19 performs what is described below with reference to a generic m-th set of final unknown time series $SET\_TH_{x,m}$; furthermore, in the following reference is made to the p-th final unknown time series $TH'_{1,p}(m)$ of the m-th set of final unknown time series $SET\_TH_x$,m as to the time series to be analysed.

In detail, the computer 19 calculates (block 706) the cepstrum (e.g. of order fifteen) of the time series to be analysed.

Subsequently, the computer 19 calculates (block 708) the so-called Martin distance between the cepstrum of the reference series $REF\_TH_p$ and the cepstrum of the time series to be analysed, so as to obtain a first feature of the time series to be analysed, said first feature being equal to a value which is the higher the more the time series to be analysed is anomalous with respect to the corresponding reference series $REF\_TH_p$, and in particular the more the spectrum of the time series to be analysed is different with respect to the spectrum of the corresponding reference series $REF\_TH_p$. In this regard, it is anticipated that in general it is possible to adopt a quantity other than the Martin distance; in fact, for the purposes of the present method it is sufficient that the aforementioned first feature is indicative of the similarity between the spectrum of the time series to be analysed and the frequency behaviour (spectrum) of the reference series $REF\_TH_p$.

Furthermore, the computer 19 calculates (block 710) the maximum of the cross-correlation function between the time series to be analysed and the reference series $REF\_TH_p$, so as to obtain a second feature of the time series to be analysed, said second feature being equal to a value which is the lower the more anomalous the time series to be analysed is with respect to the corresponding reference series $REF\_TH_p$. Even in this case, we anticipate that it is possible to adopt a quantity other than the maximum of the cross-correlation function; in fact, for the purposes of this method it is sufficient that the aforementioned second feature is indicative of the similarity in time between the time series to be analysed and the reference series $REF\_TH_p$.

Figure 18:
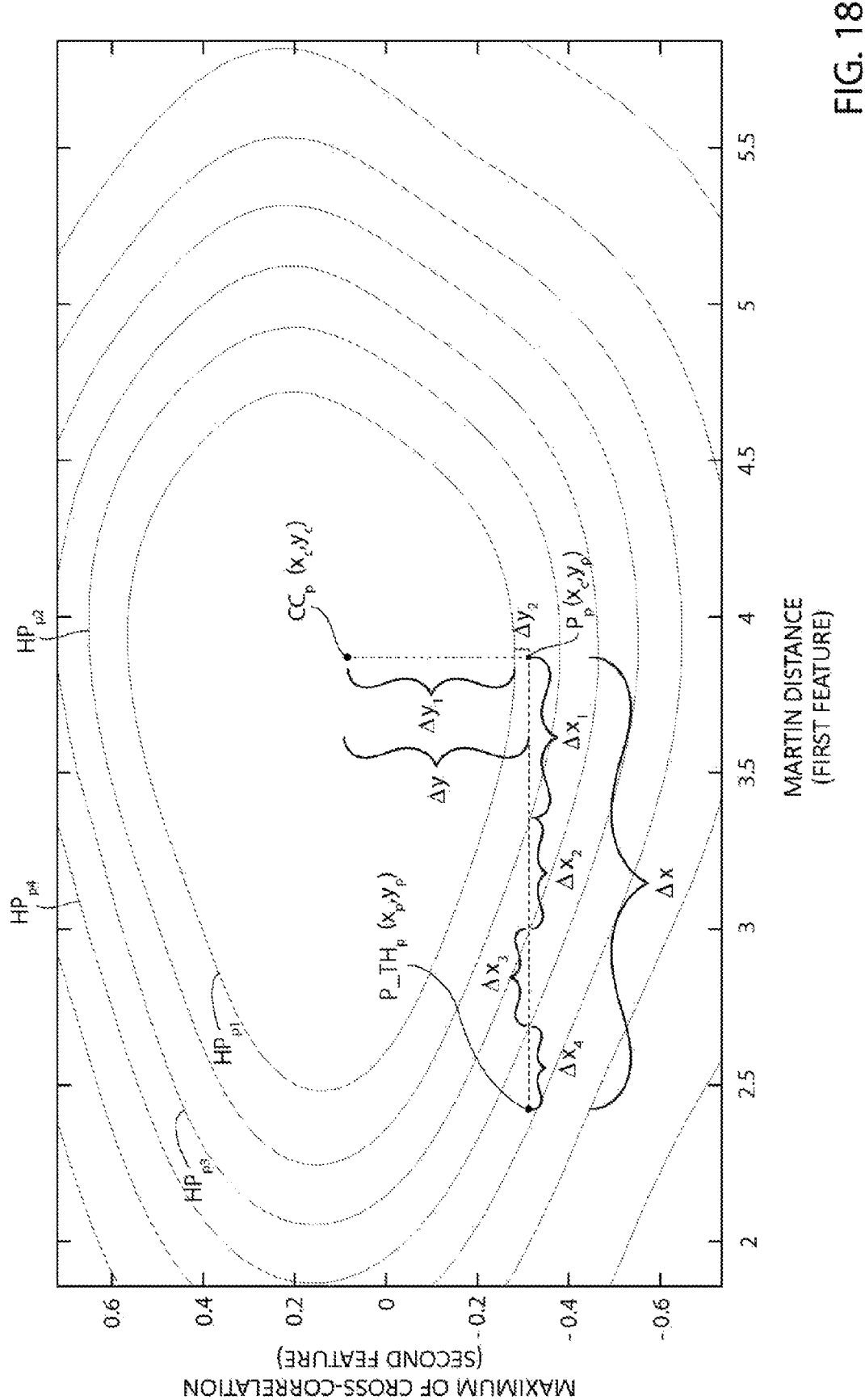
FIG. 18 shows a Cartesian plane relative to a two-dimensional hyperspace, showing boundaries of confidence hyperspaces.

In practice, the operations described so far make it possible to extract a first and a second feature of the time series to be analysed, i.e. they make it possible to determine the position of a corresponding point $P\_TH_p$ in the hyperplane (first feature, second feature), as shown in FIG. 18.

In addition, the computer 19 has a number of further classifiers, which are classifiers of the "one-class support-vector machine (one-class SVM)" type, and which are referred to as single-class classifiers.

In particular, the computer 19 has, for each of the final time series $TH_p$ (with p ranging between 1 and Pmax), a corresponding single-class classifier $SCLASS_p$, which has been trained in a per se known manner on the basis of the p-th final time series $TH_{1,p}(m)$ of the sets of final time series $SET\_TH_{1,1}$-$SET\_TH_{1,Nf}$ of the group of sets of final time series $M\_SET\_TH_1$, which, as explained above, is relative to flights where no anomalies occurred.

In particular, considering the training of the p-th single-class classifier $SCLASS_p$ and referring to the training population (FIG. 19) to indicate overall the p-th final time series $TH_1$,p (m) of the sets of final time series $SET\_TH_{1,1}$-$SET\_TH_{1,Nf}$ of the group of sets of final time series $M\_SET\_TH_1$ shown in FIG. 9, the training (indicated with 711 in FIG. 19) may be performed by calculating, on the basis of the aforementioned training population, a corresponding training reference series, and subsequently by calculating on the basis of this training reference series and in the same way described with reference to blocks 704-710, a corresponding pair of values of the first and second feature, for each of the p-th final time series $TH_{1,p}(m)$ of the sets of final time series $SET\_TH_{1,1}$-$SET\_TH_{1,Nf}$ of the group of sets of final time series $M\_SET\_TH_1$, that is, by calculating a corresponding point in the aforementioned hyperplane, and finally by training the single-class classifier $SCLASS_p$ on the basis of the points thus determined.

As shown in FIG. 18, thanks to the training, each single-class classifier $SCLASS_p$ is biunivocally associated, in a per se known manner, with a plurality of corresponding confidence hyperplanes (indicated with $HP_{p1}$, $HP_{p2}$, etc.) and with a respective confidence centre (indicated with $CC_p$).

Again with reference to FIG. 17, the computer 19 calculates (block 714) a distance present between the point $P\_TH_p$ and the corresponding confidence centre $CC_p$, as a function of the position of the point $P\_TH_p$ with respect to the confidence hyperplanes $HP_{p1}$, $HP_{p2}$, . . . . In practice, the computer 19 can adopt any metric to obtain a quantity indicative of the distance of the point $P\_TH_p$ from the corresponding confidence centre $CC_p$, this quantity being therefore indicative of the probability that the time series to be analysed is anomalous with respect to the time series on the basis of which the single-class classifier $SCLASS_p$ has been trained.

As shown purely by way of example in FIG. 18, by indicating with $(x_p, y_p)$ and with $(x_c, y_c)$ the coordinates in the hyperplane of the point $P\_TH_p$ and of the confidence centre $CC_p$, the computer 19 may calculate the distance as the sum of a first weighted distance $\Delta x$ along the abscissas, relative to the segment present between the point $P\_TH_p$ and an intermediate point $P_p$ with coordinates $(x_c, y_p)$, and of a second weighted distance $\Delta y$ along the ordinates, relative to the segment present between the intermediate point Pp and the confidence centre $CC_p$. For each of the first and second weighted distance $\Delta x$, $\Delta y$, the respective segment is formed by corresponding subsegments (FIG. 18 shows the segments $\Delta y_1$-$\Delta y_2$, relative to the second weighted distance $\Delta y$, and the segments $\Delta x_1$-$\Delta x_4$, relative to the first weighted distance $\Delta x$), each of which extends alternately in a respective zone interposed between a pair of adjacent confidence hyperplanes or in the zone extending between the confidence centre $CC_p$ and the first confidence hyperplane $HP_{p1}$; each of the first and second weighted distance $\Delta x$, $\Delta y$ is thus calculated as the sum of the lengths of the respective subsegments, each length being weighted by a coefficient indicative of the zone in which the corresponding subsegment extends, the coefficients having increasing weight as the zones move away from the confidence centre $CC_p$.

Considering again a generic m-th set of final unknown time series $SET\_TH_x,m$ of the group of sets of final unknown time series $M\_SET\_TH_x$, the operations described with reference to FIG. 17 are carried out for all the final time series $TH'_{1,1}(m)$-$TH'_{1,Pmax}(m)$, so as to obtain a second detection vector $V_c$, which comprises a number of elements equal to Pmax, the p-th element being equal to the distance calculated for the final time series $TH'_{1,p}(m)$, thus being equal to an estimate of the probability that the final time series $TH'_{1,p}(m)$ is anomalous with respect to the time series on the basis of which the p-th single-class classifier $SCLASS_p$ has been trained. Furthermore, although not shown in detail, the computer 19 may perform an (optional) normalisation operation of the second detection vector $V_c$, e.g. by subtracting the mean of all its elements and dividing the result by the standard deviation of the elements. In the following, for simplicity's sake reference is made to the second detection vector $V_c$ to indicate the outcome of the normalisation.

In addition, each second detection vector $V_c$ is associated with a corresponding time interval, which is referred to in the following as the time interval TV2. In particular, referring, for example, to the second detection vector $V_c$ corresponding to the m-th set of final unknown time series $SET\_TH_x,m$, the corresponding time interval TV2 may be equal to, for example, the temporal interval associated with the final unknown time series $TH'_{1,1}(m)$-$TH'_{1,Pmax}(m)$ of said m-th set of final unknown time series $SET\_TH_{x,m}$.

Figures 19, 20:
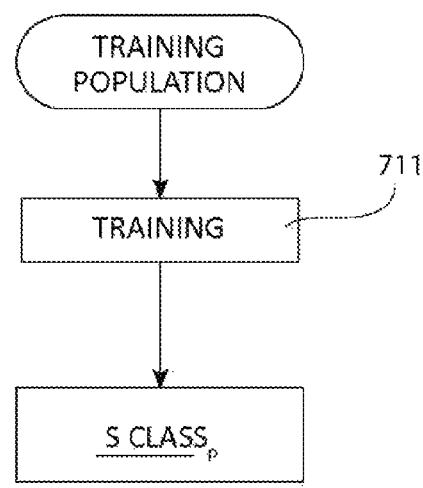

Again with reference to FIG. 7, the computer 19 is provided, for each acquisition index $AcqID_j$, with the corresponding anomaly indexes $IND1_j$, each of which is associated with the corresponding time interval $TV1_j$ and with the corresponding first detection vector $V_{Aj}$, and further has the second detection vectors $V_c$, each of which is associated with the corresponding time interval TV2, as shown in FIG. 20.

The computer 19 performs (block 800), for each acquisition index $AcqID_j$, a first filtering, i.e. it selects only the anomaly indexes $IND1_j$ which exceed an anomaly threshold and are associated to first anomaly vectors $V_{Aj}$ whose element having a maximum value is associated with a corresponding health index $HI_{j,1}$-$HI_{j,18}$; in this way, even in the presence of an anomaly index $IND1_j$ exceeding the anomaly threshold, no reporting is generated, if the maximum of the corresponding first anomaly vector $V_{Aj}$ is associated with one of the flight parameters $FP_1$-$FP_{18}$, since this situation does not correspond to a real anomaly of the transmission system. In this way, the generation of false positives is reduced.

Subsequently, for each acquisition index $AcqID_j$, the computer 19 performs (block 802) a second filtering, i.e. it selects, among the anomaly indexes $IND1$; previously selected during the execution of the operations referred to in block 800, the only groups formed by anomaly indexes $IND1_j$ i) that are associated with first consecutive detection vectors $V_{Aj}$ that have a shared anomaly field, i.e. they have respective maxima which are relative to the same health index $HI_{j,1}$-$HI_{j,18}$ and ii) are associated with corresponding time intervals $TV1_j$ which, overall, are distributed over a time span $T_{span}$ (an example shown in a simplified manner in FIG. 20) having an extension greater than a threshold duration (e.g. equal to one week). In other words, the second filtering envisages selecting only those anomalies that have been detected continuously over a period of at least a predetermined duration, and on the basis of the same health index $HI_{j,1}$-$HI_{j,18}$.

Furthermore, for each group of anomaly indexes $IND1j$ selected during the second filtering 802, the computer 19 checks (block 804) whether the presence of the anomaly is confirmed on the basis of the second detection vectors $V_c$ whose corresponding time intervals TV2 fall within the time span $T_{span}$, in which case it reports (block 806) the anomaly.

For example, the operations of block 804 may comprise checking whether all second detection vectors $V_c$ whose corresponding time intervals TV2 fall within the time span $T_{span}$ have respective elements relating to at least one same p-th final time series $TH_{1,p}$ with values above a verification threshold.

The operations referred to in block 804 make it possible to further reduce the number of false positives, since the Applicant has observed that generally, in the presence of real anomalies, at least one final unknown time series is anomalous. Furthermore, although not described in detail, the operations referred to in block 804 may vary with respect to what is described, for example by providing for checking whether at least part of the second detection vectors $V_c$ whose corresponding time intervals TV2 fall within the time span $T_{span}$ have respective elements relating to at least one same p-th final time series $TH_{1,p}$ with values above the verification threshold, or by providing that the anomaly is confirmed only if all or part of the second detection vectors $V_c$ whose corresponding time intervals TV2 fall within the time span $T_{span}$ have respective elements relating to at least a predetermined number of final time series with values above the verification threshold and/or corresponding thresholds.

It is also possible that the operations in block 804 are performed on the second detection vectors $V_c$ whose corresponding time intervals TV2 fall within an extended time span, which includes the aforementioned time span $T_{span}$, but has a greater time extension.

In case the anomaly is confirmed, the computer 19 identifies (block 808) the component/zone of the transmission system 1 to which the anomaly refers, on the basis of the acquisition index AcqID; to which the anomaly index group $IND1_j$ selected during the second filtering 802 refers, as well as on the basis of the aforementioned shared anomaly field, i.e. on the basis of the health index associated with the maxima of the first detection vectors $V_{Aj}$ associated with the anomaly indexes $IND1_j$ of the group.

According to an alternative, instead of implementing the operations referred to in block 804, i.e. instead of implementing some kind of additional filtering on the basis of the final unknown time series, the computer 19 calculates a confidence score. In particular, for each group of anomaly indexes IND1; selected during the second filtering 802, the computer 19 performs the operations in blocks 806 and 808, then reports the anomaly, and calculates a confidence score on the basis of the second detection vectors $V_c$ whose corresponding time intervals TV2 fall within the time span $T_{span}$; this confidence score is indicative of the probability that the anomaly reporting is correct.

The advantages that the present method allows to obtain emerge clearly from the previous description.

In particular, the method makes it possible to detect any damage to the transmission system very quickly and accurately. In this respect, the Applicant has observed that often the components of the transmission system, instead of breaking down instantaneously, deteriorate slowly; the present method makes it possible to detect such slow deterioration at an early stage, before the functional block of the transmission system occurs, thus enabling timely maintenance actions to be undertaken, with obvious advantages in terms of safety and optimisation of maintenance activities.

Furthermore, this method is less prone to the phenomenon of false positives due to the analysis of time series as well as health indexes. Furthermore, a considerable reduction in false positives is achieved thanks to the mechanism of discarding possible anomaly indications that are attributed, by the first-type classifiers, to the flight parameters.

Clearly, changes may be made to the method and system described and shown herein without, however, departing from the scope of the present invention, as defined in the accompanying claims.

For example, the health indexes and the processing of the primary signals, and thus the pre-processed signals and the final time series, may be different from what has been described above. Examples of primary signal processing and calculation of health indexes are described in EP0889313B1, EP0889315B1 and EP0889316B1.

The dimensions of the observation windows and the sizing of the first-type classifiers may be different from what is described.

The operations referred to in block 700, based on the final time series, may be omitted, although this entails a greater probability of false positives.

Furthermore, the time series of the group of sets of final time series $M\_SET\_TH_1$ and of the group of sets of final unknown time series $M\_SET\_TH_x$ may be acquired in additional time intervals, other than the aforementioned last time intervals of duration $\Delta T$ of each flight, although this may require the use of a more capable or complex storage system. In general, it is possible that the time series of one or more sets of the group of sets of final time series $M\_SET\_TH_1$ and/or of the group of sets of final unknown time series $M\_SET\_TH_x$ refer to time intervals to which no health index of the training flight data structure $M\_FDS_1$ and/or of the unknown flight data structure $M\_FDS_x$ refers. Furthermore, for each flight, several sets of final time series may be stored instead of just one.

Similarly, the temporal link present between each set of health indexes and the corresponding set of flight parameter values $SET\_\Delta T_w$ may be different; for example, considering any item $U_w$ and any acquisition index $AcqID_j$, and then considering a corresponding set of health indexes relating to the time interval $T_w$ and associated to the acquisition index $AcqID_j$, the corresponding set $SET\_\Delta T_w$ of the values of the flight parameters may be acquired during any instant of the time interval $T_w$, independently of the effective temporal extension of the temporal sub-domain to which the portion of the primary signal employed to calculate the aforementioned set of health indexes that are associated to the acquisition index $AcqID_j$ refers.

Regarding block 600, the first-type classifiers may be different from what is described; for example, they may be "recurrent neural network" (RNN) classifiers of the "long short-term memory" (LSTM) type or "convolutional neural network" (CNN). Similarly, the second-type classifiers may be different in number and/or of a different type than described. Moreover, even in the case of first-type and second-type classifiers described above, it is possible that they are trained, and therefore also applied, on the basis of health indexes alone, and therefore without considering flight parameters. In this case, the first filtering envisages selecting the anomaly indexes $IND1_j$ that exceed the anomaly threshold.

Where appropriate, the second classification in block 620 may be absent, although this will reduce the detection accuracy. In this case, each anomaly index $IND1_j$ coincides with a corresponding first partial anomaly index $ANV1_j$.

All filtering policies may be different, and possibly even absent, from what is described, although this may lead to an increase in false positives.

The operations described above may be carried out in a different order than described; if necessary, at least some of the operations described may be carried out in parallel.

The acquisition of the primary signals and the relative digitisation may also take place in different ways; for example, sensors may generate primary signals that are already digital. Furthermore, the processing system 10 may at least partially parallelize the query of the sensors, in which case it is for example possible that all or part of the primary signals relating to each time interval of duration $\Delta T$ extend over at least partially overlapping time domains (possibly, coinciding with the entire time interval of duration $\Delta T$). Similarly, referring to a single sensor, it is possible that at least part of the corresponding pre-processed signals, and thus also the corresponding health indexes derived therefrom, refer to the same portion of the primary signal generated by the sensor, rather than to portions of the primary signal relative to different temporal sub-domains. However, in general, temporal sub-domains relative to the same primary signal may be at least partially overlapping.

Again, with reference to the determination of the time intervals of duration $\Delta T$ and of the time intervals $TV1_j$ and $TV2$, they may be different from what has been described. In general, instead of the temporal quantities described, correlated temporal quantities may be calculated.

For example, each first detection vector $V_{Aj}$ may be associated with the time interval to which any record RCX of the corresponding unknown observation matrix OMX refers. Similarly, the time interval $TV2$ associated with each second detection vector $V_c$ may be offset from the time interval to which the corresponding final unknown time series $SET\_TH_{x,m}$ refer.

In general, temporal relationships can be modified because the time scale typical of the damage phenomena of a transmission system is large enough and also because, once a damage has occurred, it is not repaired by itself. Therefore, referring for example to block 804, it may be based on the second anomaly detection vectors $V_c$ whose corresponding time intervals $TV2$ fall within a time span offset with respect to the aforementioned time span $T_{span}$.

The sensors could be sensors of a different type with respect to what has been described, in which case also the pre-processed signals, and therefore the final time series, can be relative to quantities different from accelerations. Finally, the present method can be applied to any type of aircraft, such as for example airplanes, tiltrotors, multi-copters, etc.

The invention claimed is:

1. A computer-implemented method for detecting anomalies in a transmission system of an aircraft equipped with a monitoring system including a number of sensors coupled to the transmission system, the monitoring system being configured to determine, for each flight of the aircraft number of respective time intervals and to acquire through each sensor, for each of said time intervals, a corresponding primary signal indicative of a corresponding dynamic quantity dependent on the functioning of the transmission system during at least part of said time interval; and wherein, for each sensor, the monitoring system is configured to determine, starting from each primary signal acquired through the sensor during a corresponding time interval, a corresponding set of values of at least one corresponding group of synthetic indexes;

said method comprising the step of acquiring an unknown flight data structure that is relative to a number of flights to be analysed of the aircraft and includes, for each group of synthetic indexes, a plurality of respective records, each record comprising a respective set of values of the synthetic indexes of the group of synthetic indexes, said respective set of values being relative to a corresponding time interval of said number of flights to be analysed, each group of synthetic indexes corresponding to a respective acquisition index related to a corresponding component/or zone of the transmission system; said method further comprising, for each group of synthetic indexes:

selecting a plurality of corresponding subsets of the unknown flight data structure, each subset being formed by a number of records of the unknown flight data structure that are relative to the group of synthetic indexes and to a corresponding sequence of time intervals, the subsets also being temporally offset from each other; and by application of a first classifier corresponding to the group of synthetic indexes to each of said corresponding subsets of the unknown flight data structure, generating, for each of said corresponding subsets of the unknown flight data structure, a corresponding first detection vector, which comprises, for each synthetic index of the group of synthetic indexes, a corresponding estimate of the probability that the values of the subset relating to said synthetic index are anomalous with respect to a training condition of said corresponding first classifier;

said method further comprising the step of detecting anomalies in the transmission system on the basis of the first detection vectors; and in response to detecting one or more anomalies, identifying corresponding one or more components/or zones of thetransmission system to which the one or more anomalies refer on the basis of respective one or more acquisition indexes.

2. The method according to claim 1, further comprising for each group of synthetic indexes:

selecting individually the records of the unknown flight data structure that are relative to the group of synthetic indexes; and applying to each selected record a number of second classifiers that correspond to the group of synthetic indexes, so as to generate corresponding overall estimates, each overall estimate being indicative of the probability that the selected record is anomalous with respect to a training condition of the corresponding second classifier;

and wherein said step of detecting anomalies of the transmission system comprises detecting anomalies of the transmission system as a function of the first detection vectors and of the overall estimates.

3. The method according to claim 2, wherein said number of second classifiers that correspond to the group of synthetic indexes includes "distance-based" and/or "density-based" type classifiers.

4. The method according to claim 2, further comprising for each group of synthetic indexes:

determining, on the basis of each corresponding first detection vector, a corresponding first partial anomaly index; and for each corresponding individually selected record, generating a corresponding second partial anomaly index, as a function of the corresponding overall estimates; and associating second partial anomaly indexes with corresponding first partial anomaly indexes, as a function of the time intervals relating to the corresponding individually selected records and as a function of the sequences of time intervals relating to the corresponding subsets of the unknown flight data structure; and determining, on the basis of each pair formed by a first and a second partial anomaly index associated with each other, a corresponding anomaly index;

said method comprising comparing the anomaly index with an anomaly threshold; and wherein the step of detecting anomalies in the transmission system is a function of the outcomes of the comparisons between the anomaly indexes and the anomaly threshold.

5. The method according to claim 4, wherein the aircraft is additionally equipped with a number of additional sensors configured to detect corresponding flight parameters of the aircraft; and wherein, for each group of synthetic indexes, each corresponding record of the unknown flight data structure comprises a respective set of values of the flight parameters, which have been detected during the time interval to which the set of values of the record refers; and wherein the step of selecting a plurality of corresponding subsets of the unknown flight data structure is such that, for each subset of the unknown flight data structure, the respective records comprise the sets of values of the flight parameters relating to the corresponding sequence of time intervals; and wherein, for each group of synthetic indexes, said step of generating, for each of the corresponding subsets of the unknown flight data structure, a corresponding first detection vector is such that said corresponding first detection vector comprises, for each flight parameter, a corresponding estimate of the probability that the values of the subset relating to said flight parameter are anomalous with respect to the training condition of the first classifier corresponding to the group of synthetic indexes; and wherein the step of detecting anomalies of the transmission system comprises, for each group of synthetic indexes:

selecting respective anomaly indexes that exceed the anomaly threshold and correspond to first detection vectors having maximum probability estimates that are each relative to a corresponding synthetic index; and detecting anomalies of the transmission system as a function of the selected anomaly indexes.

6. The method according to claim 5, wherein said step of determining, for each pair formed by a first and a second partial anomaly index associated with each other, a corresponding anomaly index comprises associating to the anomaly index a corresponding time interval; said method further comprising, for each group of synthetic indexes:

starting from the respective selected anomaly indexes, selecting groups of anomaly indexes formed, each, by a plurality of selected successive anomaly indexes, which correspond to first detection vectors having maximum probability estimates that are relative to the same synthetic index and are associated with time intervals distributed over a time span having an extension greater than a duration threshold;

and wherein the step of detecting anomalies of the transmission system as a function of the selected anomaly indexes comprises detecting anomalies of the transmission system as a function of the groups of selected anomaly indexes.

7. The method according to claim 6, wherein, for each primary signal acquired through a corresponding sensor in a corresponding time interval, the monitoring system is configured to perform, on at least a portion of the primary signal, at least one corresponding set of processing operations, so as to generate at least one corresponding pre-processed signal, the monitoring system being further configured to determine said corresponding set of values of said at least one corresponding group of synthetic indexes by feature extraction of said at least one corresponding pre-processed signal.

8. The method according to claim 7, wherein the monitoring system is further configured to determine, for each flight of the aircraft, at least one respective additional time interval and to acquire through each sensor at least one corresponding additional primary signal, which is a function of a corresponding dynamic quantity that depends on the functioning of the transmission system during at least part of said additional time interval; and wherein, for each flight of the aircraft and for each sensor, the monitoring system is further configured to perform, on the additional primary signal acquired through the sensor during the corresponding additional time interval, said at least one set of processing operations corresponding to the sensor, so as to generate at least one corresponding additional pre-processed signal, relating to said at least one group of synthetic indexes that corresponds to the sensor; said method further comprising the step of:

for each of the flights to be analysed of the aircraft, acquiring a corresponding set of time series to be analysed, each time series to be analysed being formed by a corresponding additional pre-processed signal among the additional pre-processed signals generated by the monitoring system during the additional time interval of the flight to be analysed;

said method further comprising, for each set of time series to be analysed, determining a corresponding second detection vector, relating to the corresponding additional time interval, said step of determining a corresponding second detection vector comprising, for each time series to be analysed of the set of time series to be analysed:

determining a corresponding first feature and a corresponding second feature, which are indicative of the similarity, respectively in time and frequency, between the time series to be analysed and a corresponding reference series, said reference series being equal to an average of the time series to be analysed that refer to the group of synthetic indexes to which the time series to be analysed refers;

in a corresponding hyperplane including a respective confidence centre, determining a distance between the point having coordinates equal to said corresponding first and second feature and said confidence centre, said distance being a function of the position of said point with respect to a plurality of confidence hyperplanes that have been determined, together with the confidence centre by training a corresponding single-class classifier on the basis of additional pre-processed signals acquired by the monitoring system during aircraft test flights and relating to the same group of synthetic indexes to which the time series to be analysed refers;

setting equal to said distance an element of the second detection vector that refers to the time series to be analysed;

and wherein said step of detecting anomalies of the transmission system as a function of the selected groups of anomaly indexes comprises checking, for each selected group of anomaly indexes, whether the second detection vectors relating to additional time intervals that respect a time relation with the corresponding time span respect an anomaly confirmation condition and reporting an anomaly, if the anomaly confirmation condition is respected, otherwise not reporting the anomaly.

9. The method according to claim 1, wherein, for each group of synthetic indexes, the corresponding first classifier is an autoencoder-type classifier, which is configured to generate, starting from each of said corresponding subsets of the unknown flight data structure, a corresponding output matrix having dimensions equal to the dimensions of the subset of the unknown flight data structure, said method further comprising the step of generating said corresponding first detection vector starting from the corresponding output matrix.

10. The method according to claim 9, wherein, for each group of synthetic indexes, the corresponding first classifier was trained on the basis of a plurality of sets of values of the synthetic indexes of the group of synthetic indexes, which were determined during corresponding time intervals of aircraft test flights.

11. The method according to claim 1, wherein the first classifier comprises an autoencoder, a recurrent neural network (RNN) of a long short-term memory (LSTM) type, or a convolutional neural network (CNN).

12. A processing system, comprising:

a processor; and a memory coupled to the processor having stored thereon instructions that, when executed by the processor, cause the processor to detect anomalies in a transmission system of an aircraft equipped with a monitoring system including a number of sensors coupled to the transmission system, the monitoring system being configured to determine, for each flight of the aircraft a number of respective time intervals and to acquire through each sensor, for each of said time intervals, a corresponding primary signal indicative of a corresponding dynamic quantity dependent on the functioning of the transmission system during at least par of said time interval; and wherein, for each sensor, the monitoring system is configured to determine, starting from each primary signal acquired through the sensor during a corresponding time interval, a corresponding set of values of at least one corresponding group of synthetic indexes;

for said anomaly detecting, said instructions, when executed by the processor, cause the processor to:

acquire an unknown flight data structure that is relative to a number of flights to be analysed of the aircraft including, for each group of synthetic indexes, a plurality of respective records, each record comprising a respective set of values of the synthetic indexes of the group of synthetic indexes, said respective set of values being relative to a corresponding time interval of said number of flights to be analysed, each group of synthetic indexes corresponding to a respective acquisition index related to a corresponding component or zone of the transmission system;

for each group of synthetic indexes:
select a plurality of corresponding subsets of the unknown flight data structure, each subset being formed by a number of records of the unknown flight data structure that are relative to the group of synthetic indexes and to a corresponding sequence of time intervals, the subsets also being temporally offset from each other;
by application of a first classifier corresponding to the group of synthetic indexes to each of said corresponding subsets of the unknown flight data structure, generate, for each of said corresponding subsets of the unknown flight data structure, a corresponding first detection vector, which comprises, for each synthetic index of the group of synthetic indexes, a corresponding estimate of the probability that the values of the subset relating to said synthetic index are anomalous with respect to a training condition of said corresponding first classifier; detect anomalies in the transmission system on the basis of the first detection vectors; and in response to detecting one or more anomalies, identify corresponding one or more components or zones of the transmission system to which the one or more anomalies refer on the basis of respective one or more acquisition indexes.

13. A non-transitory computer readable medium storing a computer program comprising instructions that, when executed by a computer, cause the computer to perform the steps of:

detecting anomalies in a transmission system of an aircraft equipped with a monitoring system including a number of sensors coupled to the transmission system, the monitoring system being configured to determine, for each flight of the aircraft a number of respective time intervals and to acquire through each sensor, for each of said time intervals, a corresponding primary signal indicative of a corresponding dynamic quantity dependent on the functioning of the transmission system during at least part of said time interval; and wherein, for each sensor, the monitoring system is configured to determine, starting from each primary signal acquired through the sensor during a corresponding time interval, a corresponding set of values of at least one corresponding group of synthetic indexes;

wherein said anomaly detecting comprises the steps of:
acquiring an unknown flight data structure that is relative to a number of flights to be analysed of the aircraft including, for each group of synthetic indexes, a plurality of respective records, each record comprising a respective set of values of the synthetic indexes of the group of synthetic indexes, said respective set of values being relative to a corresponding time interval of said number of flights to be analysed, each group of synthetic indexes corresponding to a respective acquisition index related to a corresponding component or zone of the transmission system;

for each group of synthetic indexes:
selecting a plurality of corresponding subsets of the unknown flight data structure, each subset being formed by a number of records of the unknown flight data structure that are relative to the group of synthetic indexes and to a corresponding sequence of time intervals, the subsets also being temporally offset from each other;
by application of a first classifier corresponding to the group of synthetic indexes to each of said corresponding subsets of the unknown flight data structure, generate, for each of said corresponding subsets of the unknown flight data structure, a corresponding first detection vector, which comprises, for each synthetic index of the group of synthetic indexes, a corresponding estimate of the probability that the values of the subset relating to said synthetic index are anomalous with respect to a training condition of said corresponding first classifier; detect anomalies in the transmission system on the basis of the first detection vectors; and in response to detecting one or more anomalies, identify corresponding one or more components or zones of the transmission system to which the one or more anomalies refer on the basis of respective one or more acquisition indexes.

\* \* \* \* \*